(12) United States Patent
Foster et al.

(10) Patent No.: US 9,323,284 B2
(45) Date of Patent: Apr. 26, 2016

(54) APPARATUS FOR IMPARTING PHASE SHIFT TO INPUT WAVEFORM

(75) Inventors: Mark Foster, Sparks Glencoe, MD (US); Alexander Gaeta, Ithaca, NY (US); David Geraghty, Menlo Park, CA (US); Michal Lipson, Ithaca, NY (US); Reza Salem, Columbia, MD (US); Amy Foster, Sparks Glencoe, MD (US)

(73) Assignee: Cornell University, Ithaca, NY (US)

( * ) Notice: Subject to any disclaimer, the term of this patent is extended or adjusted under 35 U.S.C. 154(b) by 1032 days.

(21) Appl. No.: 13/124,305

(22) PCT Filed: Oct. 14, 2009

(86) PCT No.: PCT/US2009/060656
§ 371 (c)(1),
(2), (4) Date: Nov. 14, 2011

(87) PCT Pub. No.: WO2010/045339
PCT Pub. Date: Apr. 22, 2010

(65) Prior Publication Data
US 2012/0095711 A1    Apr. 19, 2012

Related U.S. Application Data

(60) Provisional application No. 61/105,217, filed on Oct. 14, 2008.

(51) Int. Cl.
*G01J 9/00* (2006.01)
*G06E 3/00* (2006.01)
(Continued)

(52) U.S. Cl.
CPC . *G06E 3/003* (2013.01); *G01J 9/00* (2013.01); *G01J 11/00* (2013.01); *G01J 2009/0226* (2013.01); *G02B 27/46* (2013.01)

(58) Field of Classification Search
CPC ............ G01J 9/00; G01J 9/0226; G01J 11/00
USPC ......... 359/330, 333; 356/484, 72, 451; 385/1; 702/67
See application file for complete search history.

(56) References Cited

U.S. PATENT DOCUMENTS

| 4,803,686 A | 2/1989 | Brock |
| 4,928,316 A | 5/1990 | Heritage |

(Continued)

FOREIGN PATENT DOCUMENTS

| CN | 1155795 A | 7/1997 |
| EP | 0753944 A1 | 1/1997 |

(Continued)

OTHER PUBLICATIONS

Patent Cooperation Treaty, International Search Report, International Application No. PCT/US2009/060656, dated Apr. 30, 2010 (3 pages).

(Continued)

*Primary Examiner* — Mark Hellner
(74) *Attorney, Agent, or Firm* — George S. Blasiak, Esq.; Heslin Rothenberg Farley & Mesiti P.C.

(57) ABSTRACT

There is set forth in one embodiment an apparatus and method for imparting a phase shift to an input waveform for output of a converted waveform. In one embodiment, a phase shift can be provided by four wave mixing of an input waveform and a pump pulse. In one embodiment, there is set forth an apparatus and method for generating a high resolution time domain representation of an input waveform comprising: dispersing the input waveform to generate a dispersed input waveform; subjecting the dispersed input waveform to four wave mixing by combining the dispersed input waveform with a dispersed pump pulse to generate a converted waveform; and presenting the converted waveform to a detector unit. In one embodiment a detector unit can include a spectrometer (spectrum analyzer) for recording of the converted waveform and output of a record representing the input waveform.

93 Claims, 16 Drawing Sheets

(51) Int. Cl.
  *G01J 11/00* (2006.01)
  *G01J 9/02* (2006.01)
  *G02B 27/46* (2006.01)

(56) References Cited

U.S. PATENT DOCUMENTS

| | | | |
|---|---|---|---|
| 5,144,637 A * | 9/1992 | Koch et al. | 372/50.21 |
| 5,453,871 A | 9/1995 | Kolner et al. | |
| 5,457,559 A * | 10/1995 | Saito et al. | 398/98 |
| 5,684,586 A | 11/1997 | Fortenberry et al. | |
| 5,777,766 A | 7/1998 | Fontana | |
| 5,778,016 A | 7/1998 | Sucha et al. | |
| 5,861,970 A | 1/1999 | Tatham | |
| 6,219,142 B1 | 4/2001 | Kane | |
| 6,266,145 B1 | 7/2001 | Lee et al. | |
| 6,288,659 B1 | 9/2001 | Jalali | |
| 6,396,856 B1 | 5/2002 | Sucha et al. | |
| 6,529,314 B1 | 3/2003 | Shukunami et al. | |
| 6,751,385 B2 | 6/2004 | Futami et al. | |
| 6,909,534 B2 | 6/2005 | Lee et al. | |
| 7,352,504 B2 | 4/2008 | Hirooka et al. | |
| 7,369,953 B2 | 5/2008 | Ozcan et al. | |
| 7,411,683 B2 * | 8/2008 | Dorrer | 356/484 |
| 7,551,267 B2 | 6/2009 | Bernath et al. | |
| 7,580,432 B2 | 8/2009 | Sucha et al. | |
| 7,738,111 B2 * | 6/2010 | Bennett | 356/484 |
| 8,064,065 B2 * | 11/2011 | Bennett | 356/484 |
| 8,275,263 B1 | 9/2012 | Franklin | |
| 8,571,421 B2 | 10/2013 | Willis | |
| 2002/0024689 A1 | 2/2002 | Shirane et al. | |
| 2003/0048503 A1 | 3/2003 | Aso | |
| 2003/0118303 A1 | 6/2003 | Evans | |
| 2004/0100681 A1 | 5/2004 | Bjarklev | |
| 2005/0063040 A1 | 3/2005 | Lee | |
| 2006/0092500 A1 | 5/2006 | Melloni | |
| 2006/0159463 A1 | 7/2006 | Futami et al. | |
| 2006/0204170 A1 | 9/2006 | Igarashi et al. | |
| 2007/0273958 A1 | 11/2007 | Hirooka et al. | |
| 2008/0152360 A1 | 6/2008 | Bennett | |
| 2008/0164863 A1 | 7/2008 | Bogoni | |
| 2008/0240651 A1 | 10/2008 | Rong | |
| 2009/0010656 A1 | 1/2009 | Futami et al. | |
| 2009/0060527 A1 | 3/2009 | Foster et al. | |
| 2012/0093519 A1 | 4/2012 | Lipson et al. | |

FOREIGN PATENT DOCUMENTS

| | | | |
|---|---|---|---|
| EP | 0774844 A1 | 5/1997 | |
| JP | 10148581 A | 6/1998 | |
| JP | 2003014548 A | 6/1998 | |
| JP | 11223575 A | 8/1999 | |
| JP | 2000171762 A | 6/2000 | |
| JP | 2006038960 A | 2/2006 | |
| JP | 2007526521 A | 9/2007 | |
| WO | WO-9205466 A1 | 4/1992 | |
| WO | PCT/US10/23195 | 2/2010 | |
| WO | WO-2010045339 A2 | 4/2010 | |

OTHER PUBLICATIONS

Patent Cooperation Treaty, Written Opinion of the International Searching Authority, International Application No. PCT/US2009/060656, dated Apr. 30, 2010 (4 pages).
Bennet, et al., C.V. "Upconversion Time Microscope Demonstration 103x Magnification of Femtosecond Waveforms" Optics Letters, vol. 24, No. 11, Jun. 1, 1999, pp. 783-785.
Bennett, Corey V. "Principles of Parametric Temporal Imaging—Part I: System Configurations" IEEE Journal of Quantum Electronics, vol. 36, No. 4, Apr. 2000, pp. 430-437.
Dorrer, Christopher, "Single-Shot Measurement of the Electric Field of Optical Waveforms by Use of Time Magnification and Heterodyning" Optics Letters, vol. 31, No. 4, Feb. 15, 2006, pp. 540-542.
Jinno et al., M. "Optical Sampling Using Nondegenerate Four-Wave Mixing in a Semiconductor Laser Amplifier" Electronic Letters, vol. 30, No. 18, Sep. 1, 1994, pp. 1489-1491.
Kauffman et al., M.T. "Time-To-Frequency Converter for Measuring Picosecond Optical Pulses" Applied Physics Letter 64 (3), Jan. 17, 1994, p. 270-272.
Kolner, Brian H. "Space-Time Duality and the Theory of Temporal Imaging" IEEE Journal of Quantum Electronics, vol. 30, No. 8, Aug. 1994, pp. 1951-1963.
Mouradian et al., Levon Kh. "Spectro-Temporal Imaging of Femotosecond Events" IEEE Journal of Quantum Electronics, vol. 36, No. 7, Jul. 2000, pp. 795-801.
Okawachi et al., Yoshitomo "High-Resolution Spectroscopy Using a Frequency Magnifier" Optics Express, vol. 17, No. 7, Mar. 30, 2009, pp. 5691-5697.
Salem et al., Reza "High-Speed Optical Sampling Using a Silicon-Chip Temporal Magnifier" Optics Express, vol. 17, No. 6, Mar. 16, 2009, pp. 4324-4329.
Salem et al., Reza "Optical Time Lens Based on Four-Wave Mixing on a Silicon Chip" Optics Letters, vol. 33, No. 10, May 15, 2008, pp. 1047-1049.
Salem et al., Reza "Signal Regeneration Using Low-Power Four Wave Mixing on Silicon Chip" Nature Photonics, vol. 2, Jan. 2008, pp. 35-38.
Patent Cooperation Treaty, International Search Report, International Application No. PCT/US2009/06056, dated Apr. 30, 2010, (3 pages).
Patent Cooperation Treaty, Written Opinion of the International Searching Authority, International Application No. PCT/US2009/06056, dated Apr. 30, 2010, (4 pages).
Patent Cooperation Treaty, International Preliminary Report on Patentability, International Application No. PCT/US2009/06056, dated Apr. 19, 2011, (5 pages).
Sharping, Jay E. et al., "Generation of sub-100-fs pulses from a microstructure-fiber-based optical parametric oscillator," Optics Express, vol. 16, No. 22, dated Oct. 27, 2008 (7 pages).
Okawachi, Yoshitomo et al., "Large tunable delays using parametric mixing and phase conjugation in Si nanowaveguides," Optics Express, vol. 16, No. 14, dated Jul. 7, 2008 (9 pages).
Foster, Mark A. et al., "Silicon-chip-based ultrafast optical oscilloscope," Macmillan Publishers Limited, vol. 456, dated Nov. 6, 2008 (5 pages).
Geraghty, David F. et al., "A Simplified Optical Correlator and its Application to Packet-Header Recognition," IEEE Photonics Technology Letters, vol. 20, No. 7, dated Apr. 1, 2008 (3 pages).
Turner, Amy C., et al., "Ultra-low parametric frequency conversion in a silicon microring resonator," Optics Express, vol. 16, No. 7, dated Mar. 31, 2008 (7 pages).
Lee, Kim Fook et al., "Telecom-Band Entanglement Generation for Chipscale Quantum Processing," dated Jan. 17, 2008 (9 pages).
Dai, Yitang et al., "1 μs tunable delay using parametric mixing and optical phase conjugation in Si waveguides: reply," Optics Express, vol. 17, No. 18, dated Aug. 31, 2009 (3 pages).
Dai, Yitang et al., "1 μs tunable delay using parametric mixing and optical phase conjugation in Si waveguides," Optics Express, vol. 17, No. 9, dated Apr. 27, 2009 (7 pages).
Broaddus, Daniel H. et al., "Silicon-waveguide-coupled high-Q chalcogenide microspheres," Optics Express, vol. 17, No. 8, dated Apr. 13, 2009 (6 pages).
Lee, Benjamin G., "Demonstration of Broadband Wavelength Conversion at 40 Gb/s in Silicon Waveguides," IEEE Photonics Technology Letters, vol. 21, No. 3, dated Feb. 1, 2009 (3 pages).
May 7, 2015 Non-Final Office Action for U.S. Appl. No. 13/147,966, filed Dec. 15, 2011 to Lipson et al.
Dec. 12, 2015 Final Office Action for U.S. Appl. No. 13/147,966, filed Dec. 15, 2011 to Lipson et al.
Mar. 20, 2014 Non-Final Office Action for U.S. Appl. No. 13/147,966, filed Dec. 15, 2011 to Lipson et al.
C. Bennet et al. Principles of Parametric Temporal Imaging—Part I: System Configurations, IEEE Journal of Quantum Electronics, vol. 36, No. 4, Apr. 2000.
C. Bennet et al., Principles of Parametric Temporal Imaging—Part II: System Performance, IEEE Journal of Quantum Electronics, vol. 36, No. 6, Jun. 2000.

(56) References Cited

OTHER PUBLICATIONS

Akhmanov, S. A., et al., "Self- action of wave packets in a nonlinear medium and femtosecond laser pulse generation," *Soy. Phys. Usp.*, 29:642-677, Jul. 1986.
Azana, J., et al., "Real-time optical spectrum analysis based on the time-space duality in chirped fiber gratings," *IEEE J. Quantum Electron.*, 36(5):517-526, May 2000.
Azana, J., et al., "Spectral Fraunhofer regime: time-to-frequency conversion by the action of a single time lens on an optical pulse," *Appl. Opt.*, 43(2):483-490, Jan. 2004.
Bennett, C. V., et al., "640 GHz real-time recording using temporal imaging," *Conference on Lasers and Electro-Optics, OSA Technical Digest Series, Optical Society of America*, 2008.
Bennett, C. V., et al., "Temporal magnification and reversal of 100 Gb/s optical data with an upconversion time microscope," *Appl. Phys. Lett.*, 65(20):2513-2515, Nov. 1994.
Bennett, C.V., et al., "Guided-wave temporal imaging based ultrafast recorders," *Science Conference and Photonic Applications Systems Technologies, OSA Technical Digest Series, Optical Society of America*, 2007.
Bromage, J., et al., "Highly sensitive, single-shot characterization for pulse widths from 0.4 to 85 ps using electro-optic shearing interferometry," *Opt. Lett.*, 31(23):3523-3525, Dec. 2006.
Cheben, P., et al., "A high-resolution silicon-on-insulator arrayed waveguide grating microspectrometer with submicrometer aperture waveguides," *Opt. Express*, 15(5):2299-2306, Mar. 2007.
Chou, J., et al., "Femtosecond real-time single-shot digitizer," *Appl. Phys. Lett.*, 91:161105-161105-3, Oct. 2007.
Chung, J. H., et al., "Real-time detection of femtosecond optical pulse sequences via time-tospace conversion in the lightwave communications band," *J. Lightwave Technol.*, 21(12):3323-3333, Dec. 2003.
Deng, K. L., "Single-shot optical sampling oscilloscope for ultrafast optical waveforms," *Lasers and Electro-Optics*, CLEO 98:268-269, 1998.
Dorrer, C., "High-speed measurements for optical telecommunication systems," *IEEE J. Sel. Top. Quantum Electron.*, 12(4):843-858, Jul./Aug. 2006.
Dorrer, C., et al., "High-dynamic-range single-shot cross-correlator based on an optical pulse replicator," *Opt. Express*, 16(18):13534-13544, Sep. 2008.
Dorrer, C., et al., "Measurement of eye diagrams and constellation diagrams of optical sources using linear optics and waveguide technology," *J. Lightwave Technol.*, 23(1):178-186, Jan. 2005.
Dorrer, C., et al., "Single-shot real-time characterization of chirped-pulse amplification systems by spectral phase interferometry for direct electric-field reconstruction," *Opt. Lett.*, 24(22): 1644-1646, Nov. 1999.
Dudley, J. M., et al., "Self-similarity in ultrafast nonlinear optics," *Nature Physics*, 3:597-603, Sep. 2007.
Dulkeith, E., et al., "Group index and group velocity dispersion in silicon-on-insulator photonic wires," *Opt. Express*, 14(9):3853-3863, May 2006.
Espinola, R. L., et al., "C-band wavelength conversion in silicon photonic wire waveguides," *Opt. Express*, 13(11):4341-4349, May 2005.
Fernandez-Pousa, C. R., "Temporal resolution limits of time-to-frequency transformations," *Opt. Lett.*, 31(20):3049-3051, Oct. 2006.
Foster, M. A., et al., "Broad-band continuous-wave parametric wavelength conversion in silicon nanowaveguides," *Opt. Express*, 15(20):12949-12958, Oct. 2007.
Foster, M. A., et al., "Broad-band optical parametric gain on a silicon photonic chip," *Nature*, 441:960-963, Jun. 2006.
Jalali, B., "Can silicon change photonics?," *Physics Status Solid.*, 205(2):213-224, 2008.
Kan'an, A. M., et al., "Efficient time-to-space conversion of femtosecond optical pulses," *J. Opt. Soc. Am.*, 15(3):1242-1245, Mar. 1998.
Kane, D. J., et al., "Single-shot measurement of the intensity and phase of an arbitrary ultrashort pulse by using frequency-resolved optical gating," *Opt. Lett.*, 18(10):823-825, May 1993.
Koch, B. R., et al., "Mode-locked silicon evanescent lasers," *Opt. Express*, 15(18):11225-11233, Sep. 2007.
Kolner, B. H., "Active pulse compression using an integrated electro-optic phse modulator," *Appl. Phys. Lett.*, 52(14):1122-1124, Apr. 1988.
Kuo, Y. H., et al., "Demonstration of wavelength conversion at 40 Gb/s data rate in silicon waveguides," *Opt. Express*, 14(24):11721-11726, Nov. 2006.
Li, J., et al., "0.5-Tb/s eye-diagram measurement by optical sampling using XPM-induced wavelength shifting in highly nonlinear fiber," *IEEE Photon. Technol. Lett.*, 16(2):566-568, Feb. 2004.
Lin, Q., et al., "Ultrabroadband parametric generation and wavelength conversion in silicon waveguides," *Opt. Express*, 14(11):4786-4799, May 2006.
Oba, K., et al., "Femtosecond single-shot correlation system: A time-domain approach," *Appl. Opt.*, 38(17):3810-3817, Jun. 1999.
Salem, R., et al., "Optical time lens based on four-wave mixing on a silicon chip," *Opt. Lett.*, 33(10):1047-1049, May 2008.
Salem, R., et al., "All-optical regeneration on a silicon chip," *Opt. Express*, 15(12):7802-7809, Jun. 2007.
Schoenlein, R. W., "Femtosecond studies of nonequilibrium electronic processes in metals," *Phys. Rev. Lett.*, 58(16):1680-1683, Apr. 1987.
Solli, D. R., et al., "Amplified wavelength-time transformation for real-time spectroscopy," *Nat. Photonics*, 2:48-51, Jan. 2008.
Solli, D. R., et al., "Optical rogue waves," *Nature*, 450:1054-1057, Dec. 2007.
Sun, P.C., et al., "Femtosecond pulse imaging: ultrafast optical oscilloscope," *J. Opt. Soc. Am. A*, 14(5):1159-1170, May 1997.
Takagi, Y., et al., "Ultrafast single-shot optical oscilloscope based on time—to-space conversion due to temporal and spatial walk-off effects in nonlinear mixing crystal," *Jpn. J. Appl. Phys.*, 44(9A):6546-6549, 2005.
Tonouchi, M., "Cutting-edge terahertz technology," *Nat. Photonics*, 1:97-105, Feb. 2007.
Turner, A. C., et al., "Tailored anomalous group-velocity dispersion in silicon channel waveguides," *Opt. Express*, 14(10):4357-4362 , May 2006.
Van Howe, J., et al., "Generation of 3.5 nJ femtosecond pulses from a continuous-wave laser without mode locking," *Opt. Lett.*, 32(11):1408-1410, Jun. 2007.
Van Howe, J., et al., "Ultrafast optical signal processing based upon space-time dualities," *J. Lightwave Technol.*, 24(7):2649-2662, Jul. 2006.
Van Howe, J., et al., "Ultrafast optical delay line by use of a time-prism pair," *Opt. Lett.*, 30(1):99-101, Jan. 2005.
Van Kampen, M., et al., "All-optical probe of coherent spin waves," *Phys. Rev. Lett.*, 88(22):227201-1-4, Jun. 2002.
Westlund, M., et al., "High- performance optical-fiber-nonlinearity-based optical waveform monitoring," *J. Lightwave Technol.*, 23(6):2012-2022, Jun. 2005.
Yamada, N., "Polarization- insensitive optical sampling system using two KTP crystals," *IEEE Photon. Technol. Lett.*, 16(1):215-217, Jan. 2004.
International Search Report and Written Opinion of the International Searching Authority for PCT/US10/23195 mailed on Sep. 30, 2010 (9 pages).
Japanese Patent Office, Decision to Grant, Oct. 8, 2013, App. No. 2011-532209 (submitted with original language version and partial English translation).
International Application Status Report, Sep. 18, 2015, App. No. PCT/US2010/023195.
International Application Status Report, Sep. 18, 2015, App. No. PCT/US2009/060656.
Sep. 22, 2014 Response to Non-Final Office Action in U.S. Appl. No. 13/147,966.
Apr. 13, 2015 Response to Final Office Action in U.S. Appl. No. 13/147,966.
Oct. 7, 2015 Response to Office Action in U.S. Appl. No. 13/147,966.

(56) References Cited

OTHER PUBLICATIONS

Notice of Allowance issued by the United States Patent and Trademark Office U.S. Appl. No. 13/147,966; Nov. 12, 2015.

Response to Notice of Allowance; U.S. Appl. No. 13/147,966; Feb. 11, 2016.

* cited by examiner

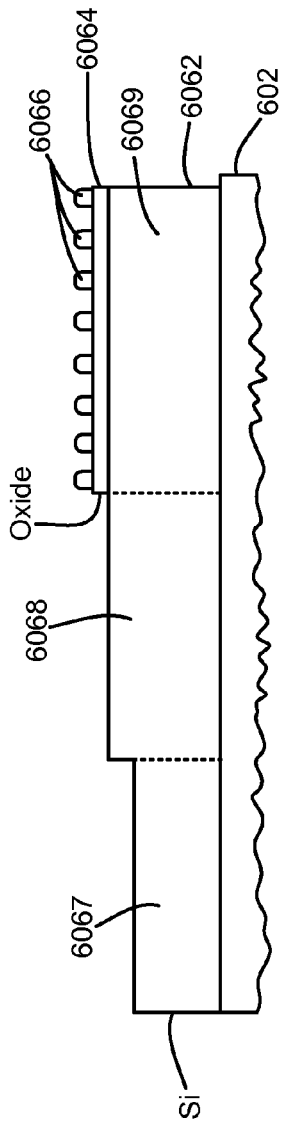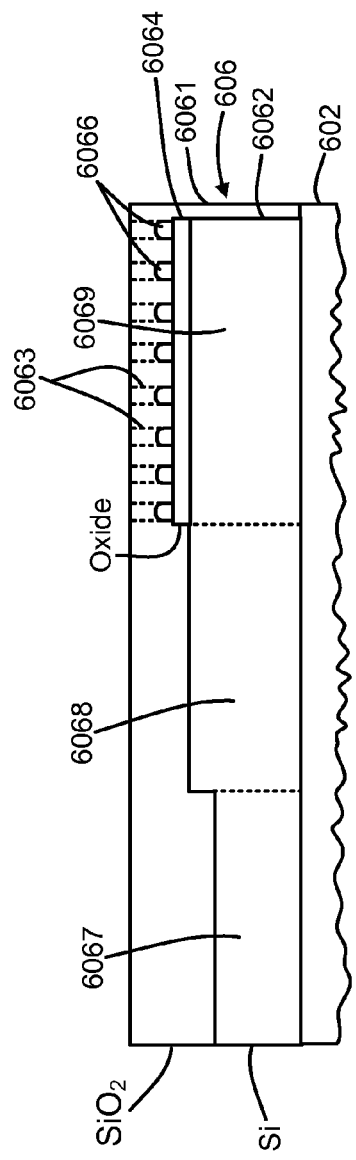

APPARATUS FOR IMPARTING PHASE SHIFT TO INPUT WAVEFORM

CROSS REFERENCE TO RELATED APPLICATIONS

This application is a National Stage application under 35 U.S.C. §371 of PCT Application No. PCT/US2009/060656, filed Oct. 14, 2009, entitled "Apparatus For Imparting Phase Shift To Input Waveform," which claims priority to U.S. Application No. 61/105,217, filed Oct. 14, 2008, entitled "Semiconductor-Based Ultrafast Optical Oscilloscope," which is incorporated herein by reference.

The disclosed invention was made with government support under the DSO OAWG Program from DARPA and under a grant to the Center for Nanoscale Systems from the National Science Foundation (Grant ECS-0335765). The government has certain rights in the invention.

FIELD OF THE INVENTION

The present invention relates to optical devices in general and specifically to optical apparatus for imparting a phase shift to an input waveform.

BACKGROUND OF THE INVENTION

With the realization of faster telecommunication data rates and an expanding interest in ultrafast chemical and physical phenomena, it has become important to develop techniques that enable simple measurements of optical waveforms with subpicosecond resolution. State-of-the-art oscilloscopes with high-speed photodetectors provide single-shot waveform measurement with 30-ps resolution. Although multiple-shot sampling techniques can achieve few-picosecond resolution, single-shot measurements are necessary to analyze events that are rapidly varying in time, asynchronous, or may occur only once. Further improvements in single-shot resolution are challenging, owing to microelectronic bandwidth limitations. To overcome these limitations, researchers have looked towards all-optical techniques because of the large processing bandwidths that photonics allow. This has generated an explosion of interest in the integration of photonics on standard electronics platforms, which has spawned the field of silicon photonics and promises to enable the next generation of computer processing units and advances in high-bandwidth communications. Several established nonlinear optical techniques exist to measure optical waveforms with few-femtosecond accuracy, but have limited single-shot record lengths of tens of picoseconds and limited update rates.

The phase shift for temporal imaging devices is typically applied using an electro-optical phase modulator, but an alternative scheme can be realized by using a parametric nonlinear wave-mixing process such as sum-frequency generation and difference-frequency generation. This latter technique is called parametric temporal imaging, and consists of wave-mixing with a linearly-chirped pump yielding a converted waveform that is nearly equivalent to the signal waveform with a linear frequency chirp or equivalently a quadratic phase shift as required for a time-lens. Parametric time-lenses have phase-shifts in excess of $100\pi$, which is significantly larger than the $10\pi$ maximally possible using an electro-optical phase modulator and therefore greatly extend the applications of temporal imaging systems. A drawback of using the sum-frequency generation and difference-frequency generation second-order nonlinear processes is that only a narrow range of materials possess a second-order nonlinear moment, and the converted waveform is inherently generated at widely different wavelengths from that of the pump or input signal. Waveform measurement based on temporal magnification using difference frequency generation has yielded promising results, including single-shot measurement of ultrafast waveforms with a resolution of less than 900 fs for a simultaneous record length of 100 ps. Waveform measurements based on time-to-frequency conversion using electro-optic modulation have demonstrated a resolution of 3 ps over a 31-ps record length using multiple-shot averaging.

For the success of silicon photonics in these areas, e.g., communications, on-chip optical signal-processing for optical performance monitoring will prove critical. Beyond next generation communications, silicon compatible ultrafast metrology would be of great utility to many fundamental research fields, as evident from the scientific impact that ultrafast measurement techniques continue to make.

SUMMARY OF THE INVENTION

There is set forth in one embodiment an apparatus and method for imparting a phase shift to an input waveform for output of a converted waveform. In one embodiment, a phase shift can be provided by four wave mixing of an input waveform and a pump pulse. In one embodiment, there is set forth an apparatus and method for generating a high resolution time domain representation of an input waveform comprising: dispersing the input waveform to generate a dispersed input waveform; subjecting the dispersed input waveform to four wave mixing by combining the dispersed input waveform with a dispersed pump pulse to generate a converted waveform; and presenting the converted waveform to a detector unit. In one embodiment a detector unit can include a spectrometer (spectrum analyzer) for recording of the converted waveform and output of a record representing the input waveform.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

FIGS. 11-14 are views illustrating an exemplary method for fabrication of a photonic chip;

DETAILED DESCRIPTION OF THE INVENTION

To span the temporal region between electronic measurement and these methods, e.g., cross-correlations, frequency resolved optical gating, and spectral phase interferometry for direct electric field reconstruction, and to allow for rapidly updateable direct optical detection, techniques have been developed using the space-time duality of electromagnetic waves and related phenomena. This duality relies on the equivalence between the paraxial wave equation, which governs diffractive propagation of a spatial field, and the scalar wave equation, which governs dispersive propagation of a temporal field. The duality implies that spatial optical components such as a lens or prism have temporal counterparts known as a time-lens or time-prism, which can be implemented by imparting a quadratic or linear temporal phase shift, respectively, on the temporal field. Furthermore, these components allow for temporal processing in a manner analogous to that of the spatial counterparts, such as temporal-imaging of the waveform.

Two methods using the space-time duality can be applied to measure ultrafast optical waveforms. Much like a spatial lens can magnify an image a temporal lens can lengthen an ultrafast waveform in time, allowing for measurement using a photodetector and an oscilloscope that would have insufficient temporal resolution for the unmagnified waveform. This technique is known as temporal magnification.

Figure 1A:
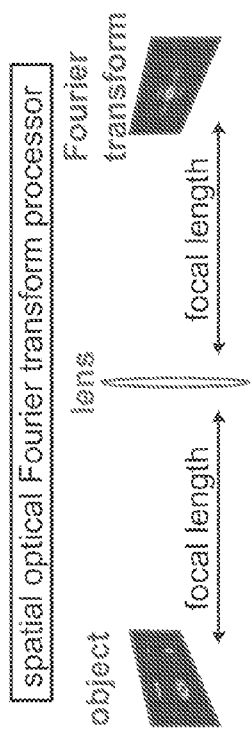
FIG. 1A is a diagram illustrating utilization of a Fourier transform property of a lens.
Figure 1B:
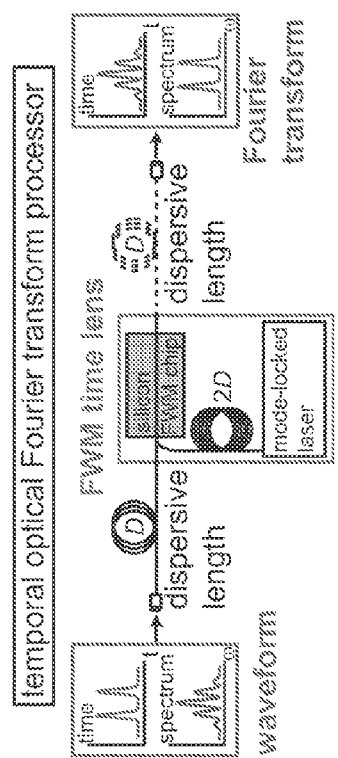
FIG. 1B is a diagram of an oscilloscope.

The second measurement method utilizes the Fourier property of a lens—an object positioned at the front focal plane of a lens will produce a Fourier transform of the object at the back focal plane (FIG. 1A). As the Fourier transform of a temporal waveform is its optical spectrum, extending the spatial Fourier processor to the temporal domain yields a device that converts the temporal (spectral) profile of the input to the spectral (temporal) profile of the output (FIG. 1B). Thus, a measurement of the spectrum at the Fourier plane directly yields the temporal amplitude of the incident waveform, and this process is termed time-to-frequency conversion.

Example 1

There is demonstrated herein a parametric time-lens based on the third order nonlinear process of four-wave mixing (FWM), and there is further demonstrated herein application of this time-lens to the creation of a silicon-chip-based ultrafast optical oscilloscope. As our device is based on the third-order Kerr nonlinearity, the FWM-based time-lens can be implemented in any material platform, including the CMOS-compatible silicon-on-insulator (SOI) photonic platform used here. The output of this time-lens is generated at a wavelength close to those of the pump and input waves, enabling all the interacting waves to be in the S, C, and L telecommunications bands, for example, which allows for the manipulation of all the waves using the well-established instrumentation and components available for these bands. Using our device, we perform measurements of highly complex waveforms with 220-fs resolution over record lengths larger than 100 ps. The combination of this 220-fs resolution and greater than 100-ps record length represents the largest record-length-to-resolution ratio (>450) of any single-shot-capable waveform measurement technique for the picosecond time range. Furthermore, unlike commonly used techniques such as frequency-resolved optical gating and spectral phase interferometry for direct electric-field reconstruction, our implementation directly measures the temporal amplitude profile using no reconstruction algorithm, allowing for rapidly updateable single-shot measurements.

We test the capability of the silicon-chip-based ultrafast optical oscilloscope with various input waveforms. Each input waveform enters the device and passes through a dispersive element consisting of a length of optical fiber. To match to the focal length of the FWM time lens, the input wave is mixed with a pump pulse that passes through twice the dispersive length of optical fiber. After passing through the optical fiber, the pump pulse and test waveform are combined and FWM is carried out in an SOI nanowaveguide. The strong optical confinement of these silicon structures allows for highly efficient nonlinear processes and for engineerable group-velocity dispersion that can yield conversion bandwidths greater than 150 nm with broad pump tunability. The resulting FWM-generated spectrum is measured using an optical spectrometer to determine the temporal profile of the input.

End of Example 1

Referring to FIGS. 1A and 1B, there is described the silicon-based ultrafast optical oscilloscope. An ultrafast optical oscilloscope is implemented using a four wave mixing based parametric time-lens on a silicon chip. Referring to FIG. 1A, there is illustrated a spatial optical Fourier transform processor. The spatial lens can generate the Fourier transform of an input waveform using the two-focal-length configuration shown. Referring to FIG. 1B, there is illustrated, a temporal optical Fourier transform processor. The time-lens can convert the temporal profile of the input to the spectral profile of the output. For the FWM time lens, the focal length (D) is half the dispersive-length of optical fiber through which the pump pulse passes (2D). Single-shot temporal measurements can then be carried out by simply measuring the spectrum at the output of the processor.

The pump-pulse bandwidth and the length of the dispersive path determine the record length and resolution of the oscilloscope. The time-to-frequency conversion factor for the FWM-based converter is given by $$\frac{\Delta t}{\Delta \omega} = -\beta_2 L \qquad \text{Eq. 1}$$

where $\Delta t$ is the temporal shift of the input signal, $\Delta \omega$ is the resulting spectral shift, $\beta_2$ is the group-velocity dispersion parameter, and L is the length of the dispersive signal path. For our system, this relation yields a 1-nm shift in converted wavelength for a 5.2-ps shift in temporal position. Using FWM, we can convert a narrow-band signal over twice the pump bandwidth, which yields the approximate record length $\tau_{RECORD}$ for the FWM-based oscilloscope $$\tau_{RECORD}=2\beta_2 L\Omega_{pump} \quad \text{Eq. 2}$$

where $\Omega_{pump}$ is the spectral bandwidth of the pump pulse. The resolution of the oscilloscope is predicted by considering the transfer of a temporal delta function through the instrument's system. This impulse response is precisely the temporal resolution $\tau_{resolution}$ of the instrument and is given by $$\tau_{resolution} = \frac{\tau_{pump}}{\sqrt{2}} \quad \text{Eq. 3}$$

where $\tau_{pump}$ is the pump pulsewidth. For our system, these relationships predict a record length of 150 ps and a resolution of 200 fs. Practically, the separation between the pump and signal and the FWM conversion bandwidth will limit the record length. Deviation from a quadratic phase on the pump pulse, such as that resulting from third-order dispersion, the FWM conversion bandwidth, and the spectral resolution of the spectrometer will also determine the temporal resolution. Since the FWM conversion bandwidth limits both the record length and the resolution, it is important to maximize this value. The silicon waveguides used in our implementation have sufficiently large conversion bandwidths (>150 nm) to allow the performance of the ultrafast optical oscilloscope to be solely limited by the aberrations caused by third-order dispersion and the spectrometer performance.

Example 2

Figure 2:
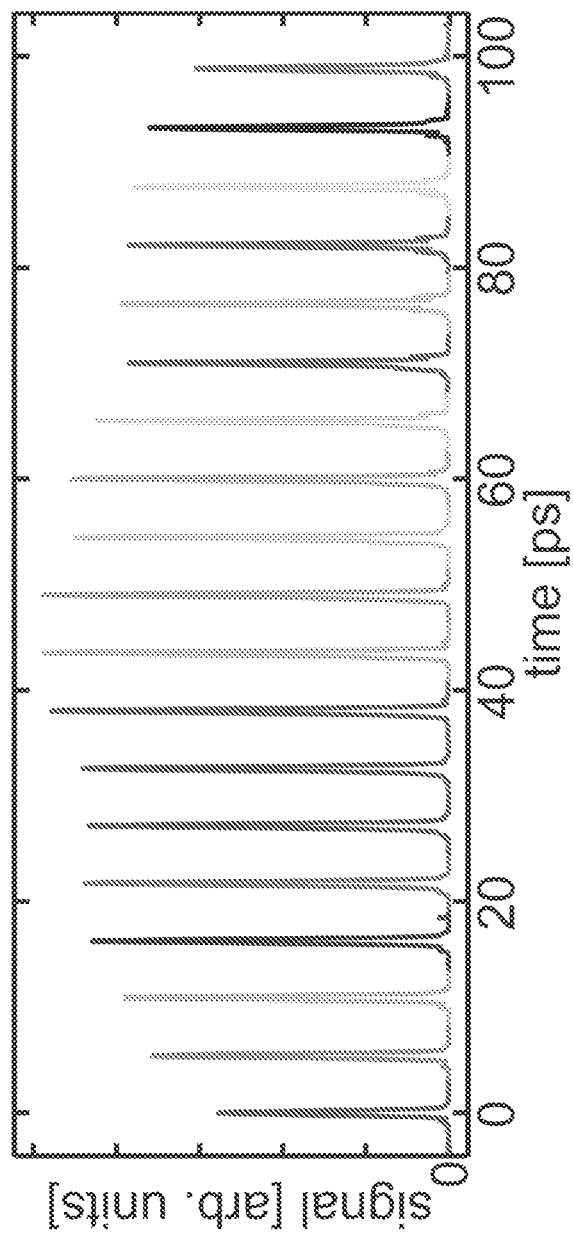
FIG. 2 is a diagram characterizing a resolution and a record length of a record output with use of an oscilloscope.

We experimentally characterize the record length and resolution of our system by injecting a 342-fs pulse and varying its temporal position. As shown in FIG. 2, we are able to measure the pulse position across a record length of 100 ps. To characterize the resolution of the FWM-based oscilloscope, we deconvolve the temporal resolution from the average observed width of this pulse across the record length of the device. We measure an average pulse width of 407 fs, which, when compared to the actual pulse width of 342 fs, indicates a temporal resolution of 220 fs for our implementation.

Referring to FIG. 2, there is set forth a diagram for characterization of the record length and resolution of the ultrafast oscilloscope. A 342-fs pulse is temporally scanned and measured using the silicon-chip-based ultrafast optical oscilloscope demonstrating a record length of 100 ps. The average width of the 342-fs pulse across this scan range, as observed by the oscilloscope, is 407 fs, indicating a deconvolved resolution of 220 fs. a.u., arbitrary units. Each color (shade) represents a separate measurement as the pulse is scanned.

End of Example 2

Example 3

To experimentally characterize the silicon-based ultrafast optical oscilloscope, we generate the pump and input waves from an ultrafast fiber laser or an optical parametric oscillator. The pulse train is spectrally separated into a 280-fs pump pulse and a signal pulse. Each input waveform enters the oscilloscope and passes through a dispersive element consisting of a 50-m length of dispersion compensation fiber and is mixed with a pump pulse that has been passed through a 100-m length of dispersion compensation fiber. The test waveforms in FIG. 3a-c were created using combinations of nonlinear spectral broadening, dispersion, and interference.

The 1.5-cm-long silicon nanowaveguide has a cross-sectional size of 300 nm by 750 nm, a linear propagation loss of 1.5 dB cm$^{-1}$, and a 3-dB coupling efficiency. For multiple-shot measurements, the FWM optical spectrum is characterized using an optical spectrum analyzer. For the single-shot demonstration, a single-shot spectrometer is implemented using a monochromator and infrared camera and a single event is created per frame.

Figure 3A:
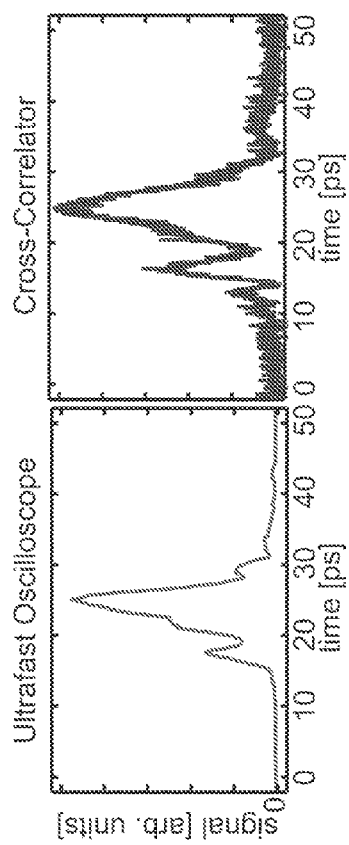
FIGS. 3A-3D are diagrams illustrating output waveforms of an oscilloscope (left side diagrams) as compared to the same waveforms being measured using a cross-correlator (right side diagrams)
Figure 3B:
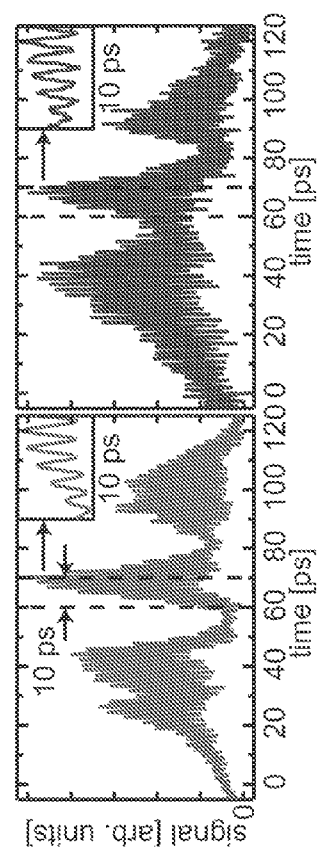
Figure 3C:
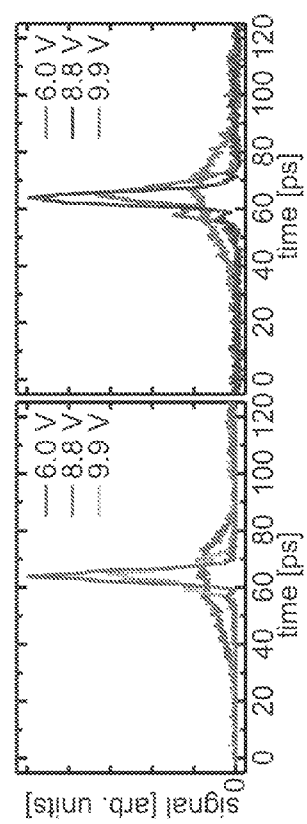
Figure 3D:
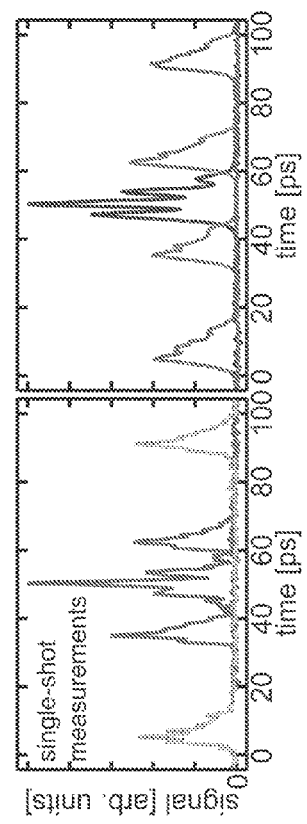

Regarding laser sources, the ultrafast fiber laser used produces 80-fs pulses at a 38-MHz repetition rate. The optical parametric oscillator used produces 150-fs pulses at a 76-MHz repetition rate. The pump pulse is a 280-fs pulse with 15 nm of bandwidth centered at 1,550 nm. The test waveforms for FIGS. 3A-3D are generated from a variable bandwidth signal pulse centered at 1,580 nm. Regarding optical fiber, we chose to use dispersion compensation fiber (Corning model: DCM-D-080-04) as it has a dispersion slope that is 12× smaller than that of standard single-mode fiber (Corning model: SMF-28). This smaller third-order dispersion reduces lens aberrations, and experimentally we find a 2× improvement in the temporal resolution as compared to an equivalent system using SMF-28. After passing through the dispersion compensation fiber, the 15-nm-bandwidth pump pulse is amplified using an erbium-doped fiber amplifier, and subsequently FWM is carried out in a CMOS-compatible embedded SOI nanowaveguide. Regarding Test waveforms, the test waveform in FIG. 3A is created by amplifying the signal pulse in an erbium-doped fiber amplifier and inducing nonlinear spectral broadening in the amplifier. The spectrally broadened pulse is subsequently passed through a 20-m length of optical fiber. The test waveform in FIG. 3B is generated by dispersing and interfering two 300-fs pulses using 50-m of optical fiber and a Michelson interferometer. The test waveforms in FIG. 3C are generated by synchronizing a time-lens compressed laser source with a repetition rate of 9.6 GHz with an ultrafast fiber laser pump source operating at 36 MHz. The pulse width of the 9.6-GHz source is determined by the magnitude of the electrical sine wave sent into a phase modulator used for the time-lens compressor. The test waveforms in FIG. 3d are generated by chirping a 300-fs pulse using 50-m of SMF-28 and splitting it into two pulses using a Michelson interferometer. The separation between the pulses can then be adjusted using a delay stage on the interferometer. Regarding the silicon waveguide, the dimensions of the silicon waveguide were chosen to maximize the conversion bandwidth by positioning a zero-group-velocity dispersion point in the C telecommunications band. The peak optical power inside the nanowaveguides is maintained below 100 mW to avoid self-phase modulation and two-photon induced free-carrier effects in the silicon. Regarding single-shot measurements, a single event is created per frame of the single-shot spectrometer. The 38-MHz source is down-sampled using an electro-optical modulator such that only one pulse is generated every 0.5 ms, which corresponds to the integration time of the camera and therefore a single-shot per camera image.

We further investigate the measurement capabilities of the silicon chip-based oscilloscope by generating test waveforms of varying complexity. First, we measure a pulse which has undergone nonlinear spectral broadening and dispersion using an ultrafast optical oscilloscope that exhibits 450-fs resolution and a 100-ps record length. The measurement of this pulse using an ultrafast optical oscilloscope compared to a cross-correlation is shown in FIG. 3A. We measure an optical waveform of even greater complexity by generating a 120-ps waveform with 900-fs temporal features. We measure this waveform using the silicon-chip-based ultrafast optical oscilloscope with 220-fs resolution. The results of this measurement and a comparison to cross-correlation are shown in FIG. 3B.

The test waveforms in FIGS. 3A and 3B are derived from the same laser source as the pump pulse. We demonstrate that the ultrafast optical oscilloscope can also be used to perform measurements of waveforms from a separate source by synchronizing a variable-pulse-width time lens-compressed laser source with a repetition rate of 9.6 GHz with the ultrafast fiber laser pump source operating at 36 MHz. Using the device with 220-fs resolution, we optimize the pulse-width of the 9.6-GHz source by observing it compress a 30-ps pulse with 30-mW peak power to a 6-ps pulse with 150-mW peak power. The results of this optimization using the ultrafast optical oscilloscope compared to cross-correlation are shown in FIG. 3C.

Lastly, we demonstrate the single-shot capability of the device by incorporating a single-shot spectrometer. We measure three single shot optical waveforms composed of two pulses with temporal separations of 86 ps, 27 ps, and nearly temporally overlapped. The results of these single-shot measurements compared with a multiple shot cross-correlation are shown in FIG. 3d. As shown by the 86-ps separation, we maintain the 100-ps record length. When the pulses overlap, we observe temporal interference fringes with a 3-ps period. For this implementation, the temporal resolution is limited to 766 fs per pixel, or a record-length-to-resolution ratio of 130, by the infrared camera. High dynamic range linear arrays with more than 1,000 pixels are commercially available, and would allow for utilization of the full (>450) record-length-to-resolution ratio of our device.

Regarding FIGS. 3A-3C, there is illustrated comparison of measurements using the ultrafast oscilloscope and a cross-correlator. Regarding FIG. 3A, there is illustrated a measurement of a 30-ps pulse generated through nonlinear spectral broadening in an erbium-doped fiber amplifier and subsequently propagated through 20 m of single-mode optical fiber. Regarding FIG. 3B, there is illustrated a measurement of a highly complex waveform generated by dispersing and interfering two 300-fs pulses. Inset, magnified view of the 10-ps temporal region from 60 ps to 70 ps. Regarding FIG. 3C, there is illustrated measurement of a separate ultrashort pulse laser source operating at various pulse durations. The silicon-chip-based ultrafast optical oscilloscope is used to minimize the pulse width emitted from this source in real time by varying the voltage to an electro-optic modulator within the laser source. Regarding FIG. 3D, there are illustrated single-shot measurements of two chirped pulses with various temporal separations compared to a multiple-shot cross-correlation. When the pulses temporally overlap, interference fringes are observed in the time domain.

In all of our measurements, we observe good agreement between our silicon-based ultrafast optical oscilloscope and the cross-correlation with a 280-fs pulse. Nevertheless some deviations are observed, which partially result from the slightly different lengths (less than 3 m variation) of optical fiber used to synchronize the arrival time of the waveforms and pump pulses to the cross-correlator as compared to the oscilloscope. Further inconsistencies are probably due to pump pulse imperfections in the FWM time-lens. For optimal performance, care must be taken to obtain a clean and flat spectral amplitude and phase for the pump pulse. Moreover, the resolution is ultimately limited by the aberrations arising from third-order dispersion in the dispersive elements. The use of dispersion-flattened fiber or dispersion engineered waveguides in the dispersive paths would alleviate this aberration, and provide a path towards sub-100-fs resolution by using a sub-100-fs pump pulse.

Here, using time-to-frequency conversion via the nonlinear process of four-wave mixing on a silicon chip, we demonstrate a waveform measurement technology within a silicon-photonic platform. We measure optical waveforms with 220-fs resolution over lengths greater than 100 ps, which represent the largest record-length-to-resolution ratio (>450) of any single-shot-capable picosecond waveform measurement technique. Our implementation allows for single-shot measurements and uses only highly developed electronic and optical materials of complementary metal-oxide semiconductor (CMOS)-compatible silicon-on-insulator technology and single-mode optical fiber. The mature silicon-on-insulator platform and the ability to integrate electronics with these CMOS compatible photonics offer great promise to extend this technology into commonplace bench-top and chip-scale instruments.

End of Example 3

The components of this measurement system can potentially be entirely integrated on-chip. Specifically, the integration of a pulsed laser source, low-loss dispersion engineered waveguides for the dispersive paths, and an integrated single-shot spectrometer and detectors are all areas of current research in silicon photonics. Furthermore, the flexibility of the FWM time-lens and the dispersion engineering available in nanowaveguides allow for straightforward extension of this technique to different wavelength regimes (for example, visible) by using other CMOS-compatible waveguiding materials such as silicon nitride (SiN) and silicon oxynitride (SiON). Additionally, using our oscilloscope for measuring an arbitrary repetition-rate source requires an ultrafast pump laser with repetition-rate flexibility and can be implemented, for example, using a time-lens compressed source. Interestingly, the single-shot capability will not only allow for measurements of single optical events but, when synchronized with an optical clock, will also allow for measurements of 'eye-diagrams' by overlaying many single-shot measurements of a communications signal. Beyond communications, an integrated measurement device would facilitate studies in many branches of science where simple, ultrafast measurements of optical waveforms are required.

Ultimately, the dynamic range for single-shot measurements is limited by the maximum power allowed in the silicon nanowaveguide while avoiding self-phase modulation and free-carrier generation, and by the minimum detectable power per pixel. These constraints should limit the range of signal peak power at the time lens from 100 μW to 100 mW, which corresponds to a dynamic range of $10^3$. The maximum power into the ultrafast optical oscilloscope is dependent on the feature width, as a narrow temporal feature will spread during dispersive propagation before the lens and therefore the peak power at the lens is significantly lower. If resolution-limited temporal features are considered, a 40 W peak power is allowed, which corresponds to a dynamic range of $10^5$. Furthermore, because the minimum detectable power depends on the desired single-shot resolution while the maximum power does not, higher dynamic range measurements are possible in this system at reduced resolution.

While use of unmatched dispersive elements for dispersing of an input waveform and a pump pulse is envisioned to advantageous in some embodiments matching of a dispersion of a dispersive element for dispersing an input waveform and a dispersion of a dispersive element for dispersing a pump pulse provides certain advantages. By configuring the dispersive elements so that their dispersions are matched as set forth herein, the input waveform will be injected one focal length from a location of a quadratic phase shift and an output waveform will include the Fourier transform of the input waveform. Accordingly a spectrum of the output waveform represents the temporal shape of the input waveform. With the output waveform containing the spectrum of the input waveform, a representation of the temporal pattern of the input waveform can be yielded by measuring the output waveform with a spectrometer irrespective of an amount of output dispersion. Accordingly, in one embodiment, a spectrometer can be used to detect an output representative of the input waveform without an output dispersive element, thus yielding size and cost advantages.

Figure 4:
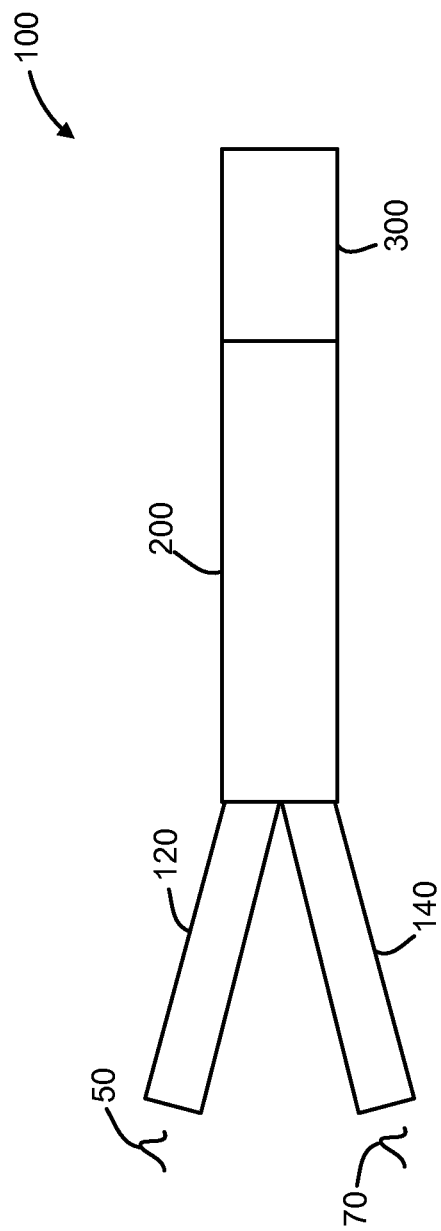
FIG. 4 is a diagram of an oscilloscope in one embodiment.

An oscilloscope in one embodiment is shown in FIG. 4. In the embodiment of FIG. 4, oscilloscope 100 includes a first dispersive element 120 and second dispersive element 140. First dispersive element 120 can be configured to be matched with second dispersive element 140 by configuring the dispersive elements so that a dispersion of the second dispersive element 140 has a 2:1 ratio with a dispersion of first dispersive element 120. Outputs of the first dispersive element 120 and the second dispersive element 140 can be coupled to an optical element 200 in the form, e.g., of a photonic waveguide (e.g., a semiconductor waveguide) in which an input waveform 50 dispersed by first dispersive element 120 and a pump pulse 70 dispersed by second dispersive element 140 combine by way of four wave mixing to output an output waveform. In another embodiment, first dispersive element 120 and second dispersive element 140 can be matched by providing the dispersion of first dispersive element 120 to have a 1:1 ratio with the dispersion of the second dispersive element 140 and by incorporating a third continuous wave or nearly continuous wave light beam in the four wave mixing process.

A detector unit 300 comprising a spectrometer can be provided to detect the spectrum of the output waveform. Because the spectrum of the output waveform includes a temporal profile of the input waveform, detector unit 300 where provided by a spectrometer can output a representation of a temporal profile of an input waveform. Because a temporal profile of the input waveform can be generated by measuring a spectrum of the output waveform, a dispersion of an output dispersive element can by arbitrary and in one embodiment detector unit 300 of a spectrometer can be substantially directly coupled (including embodiments that are directly coupled) to an output of optical element 200 for measuring a spectrum of an output waveform and therefore generating a representation of a temporal shape of an input waveform. In the embodiment as shown in FIG. 4, measurement unit 300 provided by a spectrometer is coupled to optical element 200 provided by semiconductor waveguide in which four wave mixing occurs without there being a dispersive element interposed between optical element 200 and detector unit 300. Coupling of a spectrometer substantially directly to a photonic waveguide reduces output dispersion and accordingly reduces a size of oscilloscope 100 relative to an alternative design in which an output dispersive element can be provided. In the embodiment of FIG. 4, first and second dispersive elements 120, 140 can be provided e.g., by integrated photonic waveguides (e.g., semiconductor waveguides), optical fibers, chirped Bragg gratings in waveguides, free space gratings, prisms, and the like.

Figure 5:
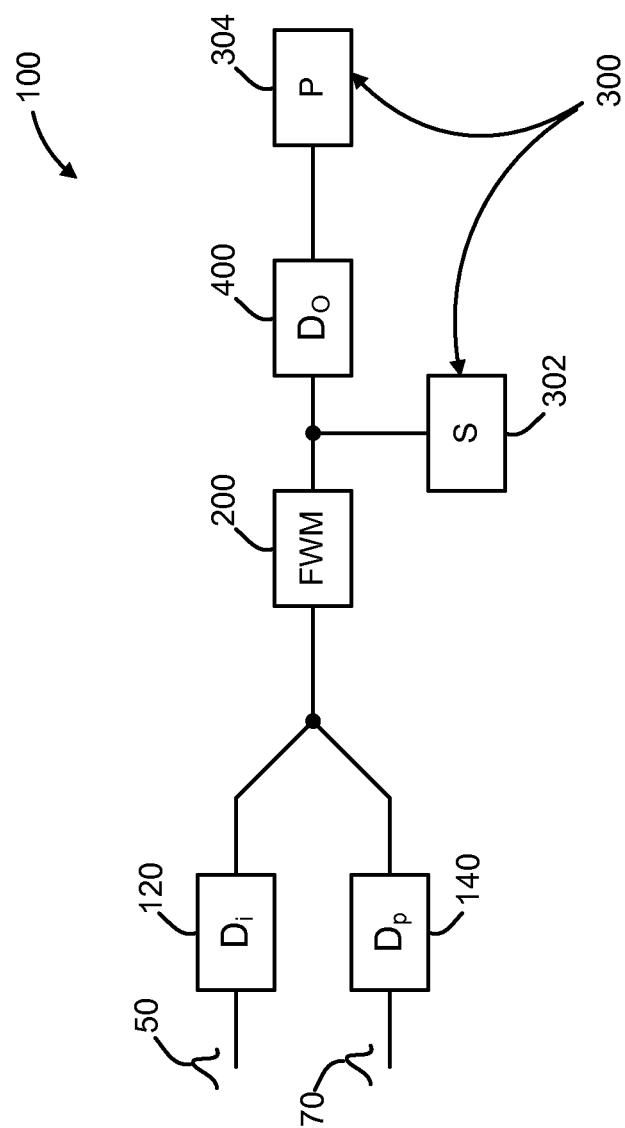
FIG. 5 is a diagram of an oscilloscope having multiple outputs.

With reference to FIG. 5, an embodiment is shown in which a detector unit 300 for oscilloscope 100 includes both of a spectrometer 302 and a photodetector 304. First dispersive element 120, second dispersive element 140, and optical element 200 can be provided as described in connection with FIG. 4 and an output dispersive element 400 can be provided onto which photodetector 304 can be coupled. Spectrometer 302 can be provided to measure temporal profile of an input waveform by detection of a spectrum of an output waveform output by optical element 200. Photodetector 304 can be used to measure a temporal shape of an input waveform directly. Spectrometer 302 is shown as being directly coupled to the output of four wave mixing optical element 200 prior to dispersive element 400 but in principle can be coupled to output dispersive element 400 at any point along a length thereof. Coupling spectrometer 304 to the output of four wave mixing optical element 200 improves a strength of a measured signal as losses that can be incurred as a result of propagation through dispersive element 400 are avoided. In another embodiment, oscilloscope 100 is operative to subject to an input waveform to a phase shift by way of a process other than four wave mixing. Regarding spectrometer 302, spectrometer 302 in one embodiment can include a spectral filter and can be operative to detect a band of wavelengths within a spectrum of an output waveform.

Regarding spectrometer 302 and photodetector 304, spectrometer 302 in some embodiments can be advantageous for detection of relatively weak signals. Regarding photodetector 304, photodetector 304 can be advantageous for faster sampling of waveforms allowing additional measurements per second with higher magnification factors, M, and where a signal R being represented has more closely spaced temporal features, a record output with use of a photodetector can represent spaced temporal features as overlapping features, the limiting an output record length of the oscilloscope. When a record is output using a spectrometer, an output record length is generally limited by an instrument record length as given in Eq. 2. Because use of a spectrometer for output of a data record can increase an output record length relative to an output record length provided with use of a photodetector, a spectrometer can be advantageous in applications where there are complex signals having relatively closely spaced temporal features. Accordingly, the providing of both spectrometer 302 and photodetector 304 optimizes the generation of an output record representation of an input waveform for a wide range of applications.

Where a group velocity dispersion of an output dispersive element 400 is sufficiently larger than a group velocity dispersion of an input dispersive element, and where an input dispersive element is appropriately matched to a pump dispersive element, a magnification of an input waveform input into oscilloscope 100 as set forth herein is given by the magnification factor of $$M = d_o L_o / d_i L_i = D_o / D_i \qquad \text{Eq. 4}$$

where $d_o$ is the group velocity dispersion per unit length of the output dispersive element, $d_i$ is the group velocity dispersive of the input dispersive element, $L_o$ is the length of the output dispersive element, and $L_i$ is the length of the input dispersive element, Do is the group velocity output dispersion, and $D_i$ is the group velocity input dispersion. A temporal width of an output waveform can be controlled by controlling a dispersion of an output dispersive element. In development of oscilloscope 100, it was determined that the time lens defined by optical element 200 and a dispersed pump pulse operates in the manner of a spatial lens in the aspect that if an input waveform is input one focal length from a location of a quadratic phase shift, a representation of an input waveform will be contained in an output waveform irrespective of the amount of output dispersion, the output dispersion determining a magnification factor.

In generating a representation of the input waveform an output resolution of a represented waveform can be limited by the measurement resolution of detection unit 300. For example, a given photodetector 304 will generally have a measurement resolution limit $Res_M$. In some instances, an output resolution of oscilloscope 100 can be limited by the measurement resolution. However, it is seen that as a measurement resolution of a detection unit 300 becomes smaller (tending to the ideal), an output resolution of oscilloscope 100 can be limited only by $\tau_{resolution}$, as has been set forth herein. The parameter $\tau_{resolution}$ can be regarded as the instrument resolution of oscilloscope 100. In general, if $$\frac{Res_M}{M} > \tau_{resolution} \qquad \text{Eq. 5}$$

then an output resolution of oscilloscope 100 will be limited by the measurement resolution limit. If $$\frac{Res_M}{M} \leq \tau_{resolution} \qquad \text{Eq. 6}$$

then an output resolution of oscilloscope 100 will be limited by the instrument resolution, such that a measurement resolution limit will not limit the output resolution. Configuring oscilloscope 100 so that the output resolution is limited by the instrument resolution can be advantageous. Referring to Eq. 6, it can be seen that such configuration can be achieved using any photodetector (even a poor resolution photodetector) by adjusting the magnification factor M. Adjusting the magnification factor can be accomplished by selecting an output dispersive element with greater output dispersion $D_o$.

In a particular embodiment, a dispersion of an output dispersive element 400 of oscilloscope 100 can be selected so that the value of $Res_M/M$ is about equal to or less than $\tau_{resolution}$ so that an output resolution is limited by the instrument resolution. By selection of an output dispersion so that $Res_M/M$ is about equal to $\tau_{resolution}$, an output resolution can be limited by the instrument resolution while cost consumption resulting from use of excess dispersive material is avoided.

Taking into consideration equations 3 and 6, if an output dispersive element of oscilloscope 100 is selected so that the condition $$\frac{Res_M}{M} \leq \frac{\tau_{pump}}{\sqrt{2}} \qquad \text{Eq. 7}$$

is satisfied, then an output resolution of oscilloscope 100 can be advantageously limited only by an instrument resolution, and if $Res_M/M$ is about equal to $\tau_{pump}/2$, use of dispersive material can be economized.

Figure 6:
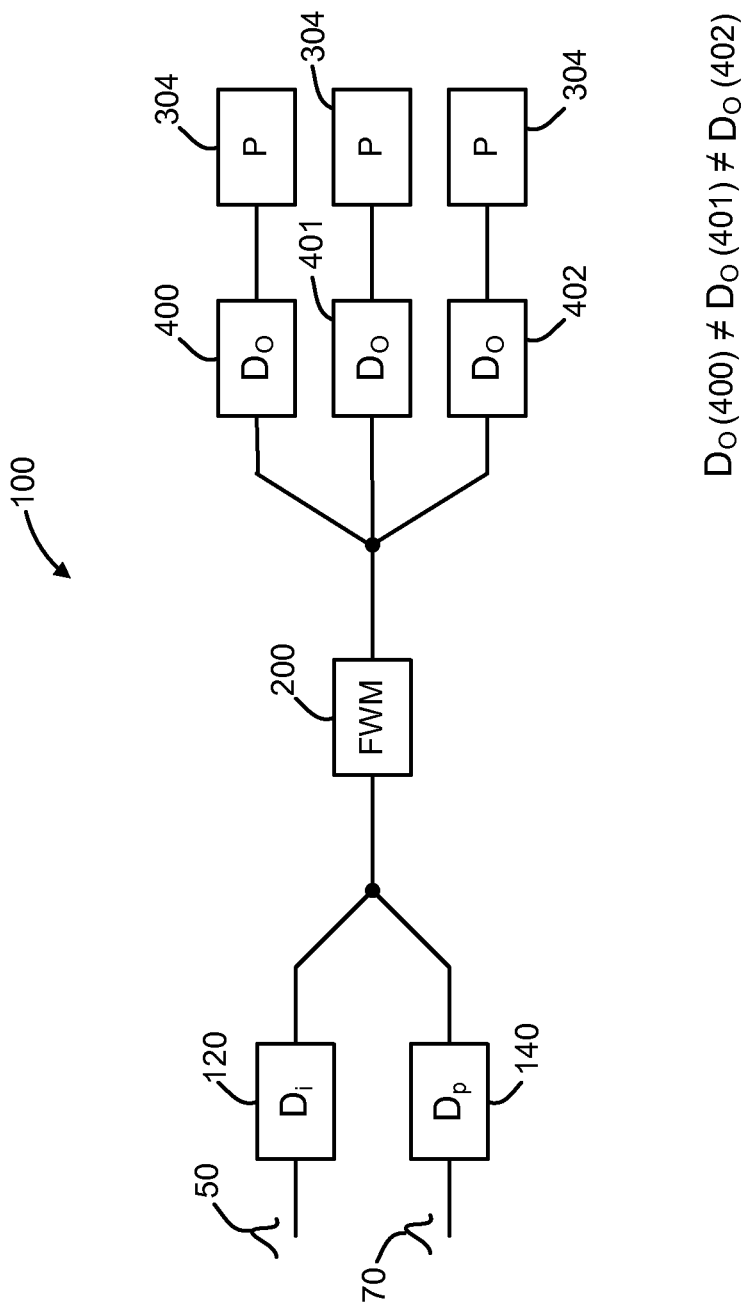
FIG. 6 is a diagram of an oscilloscope having multiple outputs.

Referring to the oscilloscope of FIG. 6, oscilloscope 100 can include multiple output dispersive elements 400, 401, 402, each with a different output dispersion $D_o$. Oscilloscope 100 can further have a different photodetector 304 associated with each dispersive element. Because of the different dispersions associated with the various dispersive elements 400, 401, 402, the magnification factor and output waveform temporal width associated with each output dispersive element 400, 401, 402 will be different.

It has been mentioned that establishing a magnification factor, M, of apparatus 100 so that an output resolution is not limited by a measurement resolution of detector unit 300 can be advantageous. It can also be advantageous to establish a magnification factor M so that an output resolution is limited by a measurement resolution limit of detector unit 300. While larger magnification factors, M, can lead to better output resolutions, an output record length of oscilloscope 100 in which a photodetector is utilized for output of a data record tends to become shorter with higher magnifications. With higher magnification factors, M, spaced apart but closely spaced pulses can be erroneously represented as overlapping pulses in an output data record output with use of a photodetector 304.

Conversely, as a magnification factor, M decreases, an output record length of oscilloscope 100 having an output data record detected with use of a photodetector can increase and can become limited only by an instrument record length given by Eq. 2. Providing a relatively longer output record length can yield important advantages. For example, where a set of encoded bits encoded within use of Gaussian pulses is being subject to analysis, a larger record length provides an expanded succession of pulses that can be subject to analysis thus allowing types of analyses requiring larger sample.

Figure 7:
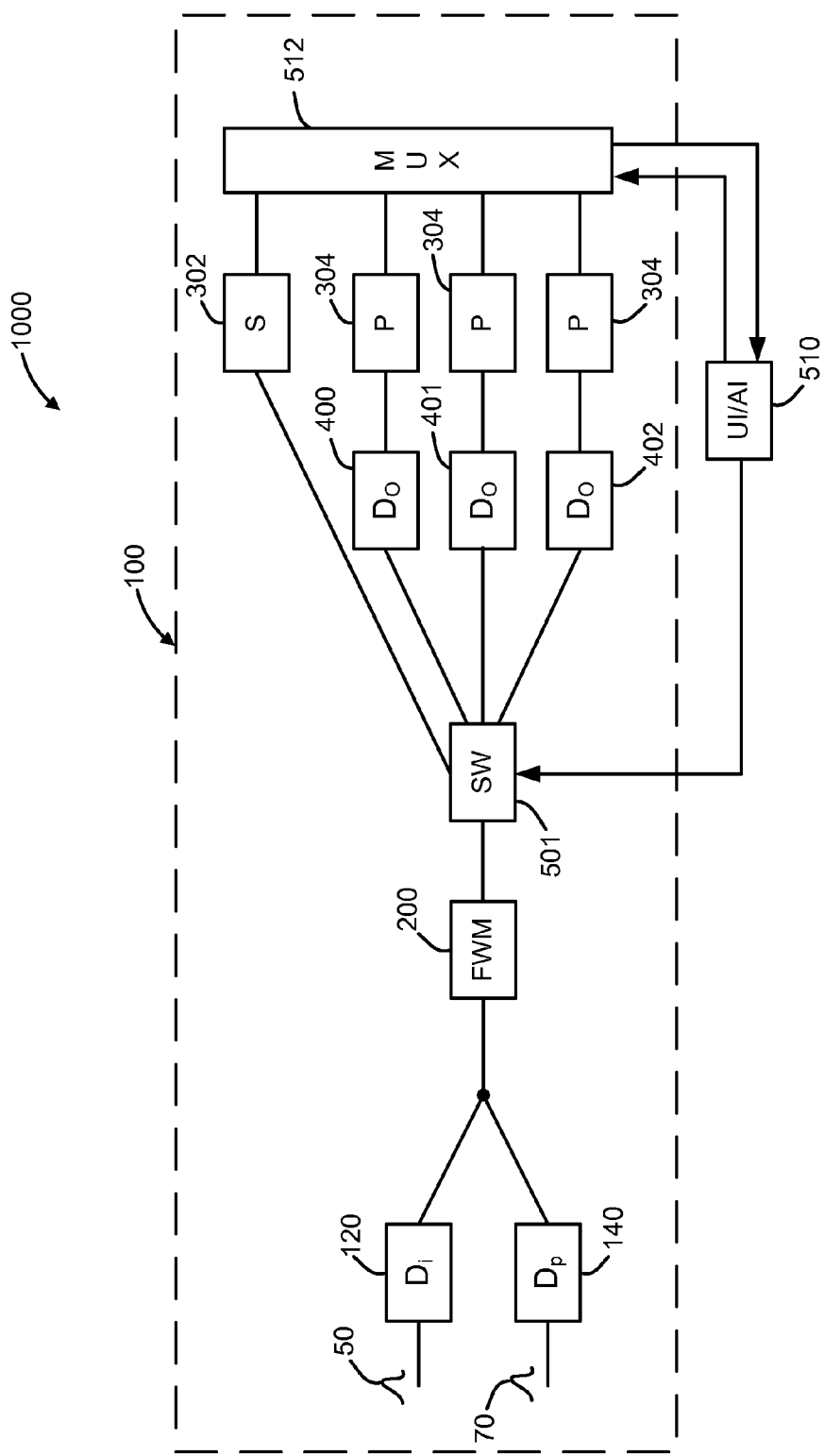
FIG. 7 is a diagram of an oscilloscope having multiple outputs incorporated in a system having a user interface.

Referring to the oscilloscope 100 incorporated into a system 1000 as shown in FIG. 7, oscilloscope 100 includes a plurality of output dispersive elements 400, 401, 402, and switch 501 for coupling an output of optical element 200 to a select one of dispersive elements 400, 401, 402 and to spectrometer 302. A photodetector 304 can be coupled to each dispersive element 400, 401, 402. Switch 501 can be operative to couple an output of optical element 200 to spectrometer 302, as set forth in the embodiment of FIG. 5. A user interface 510 having both control actuators and an indicator, e.g., an electronic display, can be coupled to switch 100 such that commands can be entered by an operation using user interface (UI) 510.

Oscilloscope 100 can be operative to allow an operator to change an output format of an output data record by input of one or more commands input utilizing user interface 510. Oscilloscope 100 can include multiplexer 512 coupled to spectrometer 302 and each photodetector 304. Multiplexer 512 can be operative for coupling an output data record output by the appropriate one of photodetector 304 or of spectrometer 302 to user interface 510 based on a state of switch 501. The arrangement of FIG. 7 reduces an amount of signal loss by way of coupling through multiple dispersive elements. Oscilloscope 100 in the embodiment of FIG. 7 can be operative to output a data record in a different output format depending on which of spectrometer 302 or which one of photodetector 304 is active for output of the data record.

Figure 8:
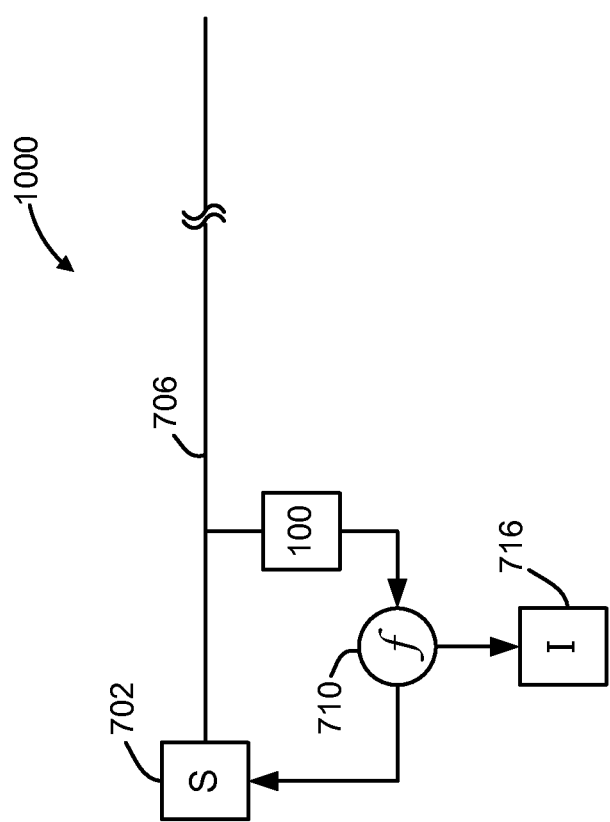
FIG. 8 is a diagram of a system incorporating an oscilloscope.
Figure 9:
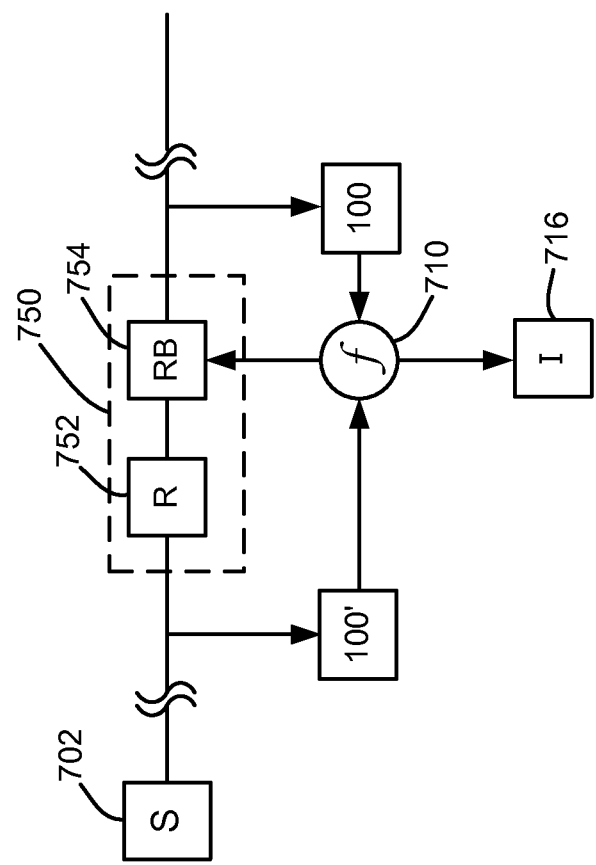
FIG. 9 is a diagram of a system incorporating an oscilloscope.

In one embodiment, user interface 510 of oscilloscope 100 can be replaced with an application interface (AI) such as a program application as may be executed by a processing unit, e.g., processing unit 710 as described herein in connection with FIGS. 8-9. A program application, in one example, can be a program application run by a processing unit for determining an input to a system control. Accordingly, user interface 510 as shown in FIG. 7 is referenced with the label UI/AI to designate its replaceability with an application interface. Examples wherein an output of oscilloscope input into an application interface for system control are described in connection with FIGS. 8 and 9 herein.

It has been described that oscilloscopes as set forth herein can record measurements having resolutions of at least 220 fs and record lengths of at least 100 ps. Accordingly, for an output series of pulses, an output record can include a representation of a plurality of pulses.

As set forth herein, oscilloscope 100 can be operative to generate a representation of a temporal profile or an input pulse. An application utilizing oscilloscope 100 is described with reference to FIG. 8.

A system 1000 incorporating oscilloscope 100, as set forth in any of the embodiments herein, can include an optical data encoding source 702 and a fiber optic transmission line 706. Oscilloscope 1000 can be coupled to transmission line 710 at a location proximate to the data source 702 for outputting representations of waveform at the output of the data source. System 1000 can be operative to utilize oscilloscope 100 for determining a quality of data being transmitted by data source 700.

Data source 702 can include a transmitter having a modulator and encoder and can be operative to encode optical data so that encoded data has a predetermined set of nominal characteristics. For example, data source 702 can be operative to encode a bit stream, wherein bits are encoded with pulses, wherein each pulse of a succession of pulses includes predetermined nominal profiles, indicated e.g., by pulse shapes, widths and amplitudes. Oscilloscope 100, which in one embodiment can be configured in accordance with the embodiment of FIG. 7, can output records including representations of the temporal profiles of one or more of pulses and system 1000 can be operative to process the plurality of temporal profiles.

Records output with use of oscilloscope 100 can be transmitted to processing unit 710 for processing. Processing unit 710, which can be CPU-based, can process representations of a succession of pulses to determine whether the succession of pulses satisfy criteria indicative of the pulses having the nominal profiles within an acceptable tolerance. Such criteria can include, e.g., whether a standard deviation of pulse width, shape, or amplitude over a series of pulses is above a threshold. For determining whether a succession of pulses exhibit the nominal profiles processing unit 710 in one embodiment can generate an eye diagram by overlaying a plurality of pulse representations. Processing unit 710 can determine that data encoding is satisfactory if the eye diagram has predetermined characteristics. A process executed by processing unit 710 with respect to an eye diagram can comprise one or more of processing to determine whether there is a clear eye view, processing to determine whether an extinction ratio is above a threshold, processing to determine whether a noise level on "ones" is above a threshold, processing to determine whether a timing jitter is above a threshold value. Quantitative values can be extracted from such eye diagrams, e.g., bathtub curves.

In performing a determination respecting data quality, processing unit 710 can be operative to determine whether a plurality of pulses, e.g., a succession of pulses, have consistent profiles. The noted eye diagram processing is useful for such determination for evaluation of data quality. Processing unit 710 can be operative to also evaluate a single pulse or a limited number of pulses to determine whether the single pulse or series of pulses have nominal characteristics. In general, for the first type of processing (analysis for profile consistency), a record having a larger record length can be advantageous. For the second type of processing (single or limited number of pulse representations examined for deviation from a nominal profile) a shorter record length, higher output resolution record can be advantageous. In the embodiments set forth herein, oscilloscope 100 can be operative to output records in a plurality of output format, including one output format with longer record length, a second output format with better output resolution. In one embodiment, a data quality evaluating processing unit 710 can be operative to transmit one or more communications to oscilloscope 100 so that oscilloscope 100 outputs both a first and second records, the first record having a first format with longer record length and lesser resolution and the second record having a second format with shorter output record length and better resolution. Processing unit 710 can be operative to process each of the first record having a longer record length and lesser output resolution and the second record having shorter record length and more optimal output resolution for performance of data quality evaluation, and for determining an output of the processing unit. For example, processing unit 710 can be operative to utilize a record having the first format for the first type of processing set forth herein (analysis for profile consistency) and can further be operative to utilize a record having the second format for the second type of processing (analysis for deviation from a nominal profile). For the first type of processing (analysis for profile consistency) processing unit 710 can utilize a record output with use of spectrometer 302. Records output with use of spectrometer 302 generally have relatively longer output record lengths corresponding to an instrument record length.

If the quality evaluation performed by processing unit 710 indicates that the data is satisfactory, an output that is output by processing unit 710 can comprise one or more communications to an indicator 716 indicating that the data is satisfactory. If the processing unit 710 determines that the predetermined criteria is not satisfactory, an output that is output by processing unit 710 can comprise one or more communication transactions to indicator 716 resulting in the indicator indicating failure of the data. If processing unit 710 determines that the criteria indicative of satisfactory data quality is not satisfied, an output that is output by processing unit 710 can comprise one or more communications to source 702, responsively to which source 702 can adjust one or more control parameters controlling a transmitter of the data source. Such control parameters can be e.g., a light polarization parameter, a bias voltage parameter, an RF power parameter.

Figure 10:
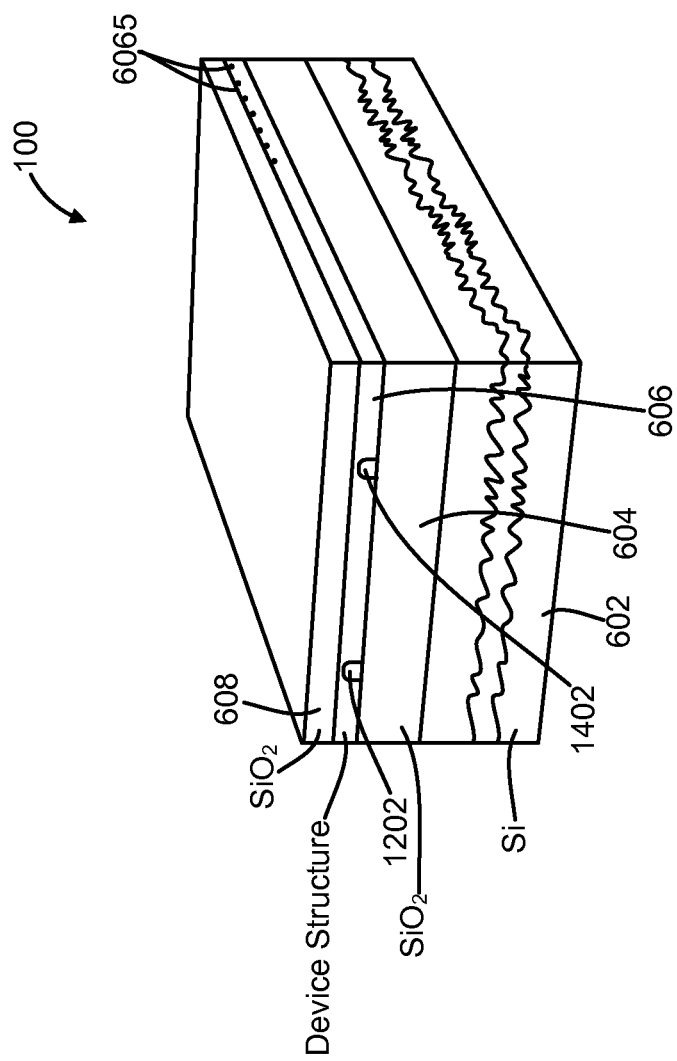
FIG. 10 is a schematic cross-sectional view of a photonic chip having an oscilloscope incorporated therein.

Referring now to system 1000 of FIG. 9, one or more oscilloscopes 100, 100' can be operationally disposed proximate an optical communications data repeater 750 which comprise a receiver 752 and a rebroadcaster 754, rebroadcaster 754 can include a transmitter having a modulator and encoder. A first oscilloscope 100 can be coupled to an output of receiver 752 and can be arranged to transmit an output to processing unit 710. A second oscilloscope 100' configured according to any embodiment of oscilloscope 100 set forth herein can be coupled to an input of receiver 752 and can be operative to transmit an output to processing unit 710. For determining a quality of data output by rebroadcaster 754, processing unit 710 can compare data output by rebroadcaster 754 to data input to receiver 752. Responsively to such comparing, processing unit 710 can transmit one or more communications to rebroadcaster 754 responsively to which rebroadcaster 754 can adjust operational parameters of a transmitter therein. Such operational parameters can include, e.g., a light polarization parameter, a bias voltage, an RF power parameter. Processing unit 710 can also be operative to perform quality evaluation of optical data output by rebroadcaster 754, in the manner of processing unit 710 of the example of FIG. 10 with respect to data output by data source 702. Each of source 702 and rebroadcaster 754 can be regarded as an apparatus for transmission of encoded data. If processing unit 710 determines that the criteria indicative of satisfactory data quality is not satisfied, an output that is output by processing unit 710 can comprise one or more communications to rebroadcaster 754, responsively to which rebroadcaster 754 can adjust one or more control parameters controlling a transmitter of rebroadcaster 754. Such control parameters can be e.g., a light polarization parameter, a bias voltage parameter, an RF power parameter.

In one embodiment, a system 1000, including oscilloscope 100 can be operative so that oscilloscope 100 outputs data records for processing by processing unit 710 in varying record formats that vary on an open loop basis. In another embodiment, system 1000 can be operative so that a record format output by oscilloscope 100 for processing by processing unit 710 is dynamically varied on a closed loop basis, i.e., a record format can be responsive to a processing of previous record. In one example, processing unit 710 can process a first data record in a first format output utilizing a photodetector. As part of a processing of the first data record processing unit 710 can examine an amplitude of a pulse represented in the first record. System 1000 can be operative so that if processing unit 710 determines that the pulse amplitude is below a threshold, processing unit 710 can transmit one or more communications to oscilloscope 100 responsively to which oscilloscope 100 can change an output format of oscilloscope to a second record output format that is output utilizing spectrometer 302. Processing unit 710 can then carry out a data quality evaluation processing as set forth herein utilizing the second record and can provide feedback to an apparatus for transmission, e.g., a data source 700, responsively to the processing in the manner set forth herein (resulting in an adjustment of an operational parameter). Because spectrometer 304 can often be provided with a given set of cost restraints in a form having better sensitivity and greater capacity to sense relatively weak signals, the processing of the data record of the second format output utilizing spectrometer can improve the accuracy and reliability of the data processing.

In the embodiment set forth with reference to FIGS. 10-15, elements of an oscilloscope 100 are shown as being provided in a chip scale product manufactured (fabricated) by a utilizing a complimentary metal-oxide semiconductor (CMOS) integrated circuit manufacturing process. It will be understood that while some embodiments of a photonic chip can be devoid of semiconductor material, a manufacturing method can nevertheless be regarded as a CMOS manufacturing method as manufacturing steps common for fabrication of CMOS integrated circuits can be utilized.

In the embodiment of FIGS. 10-15, first dispersive element 120 and second dispersive element 140 are shown as being provided by photonic waveguides fabricated by way of a CMOS fabrication process. Referring to the embodiment of FIGS. 10-15 and as seen in the top device structure view of FIG. 15, oscilloscope 100 can include an optical element 200 provided by a photonic waveguide onto which the outputs of first dispersive element 120 and second dispersive element 140 can be coupled. A dispersion of second dispersive element 140 can be matched to a dispersion of first dispersive element 120. An input waveform that is input at input 1202 can be dispersed by a first dispersive element 120 and combined by way of four wave mixing with a pump pulse that is input at input 1402 and dispersed by second dispersive element 140.

Regarding the specific photonic chip embodiment of oscilloscope as shown in FIGS. 10-15, oscilloscope 100 can include alternating insulator and semiconductor layers. Oscilloscope 100 as shown in FIGS. 10-15 can include a semiconductor substrate 602, insulator layer 604, a device structure 606, and an insulator layer 608.

Figure 11:
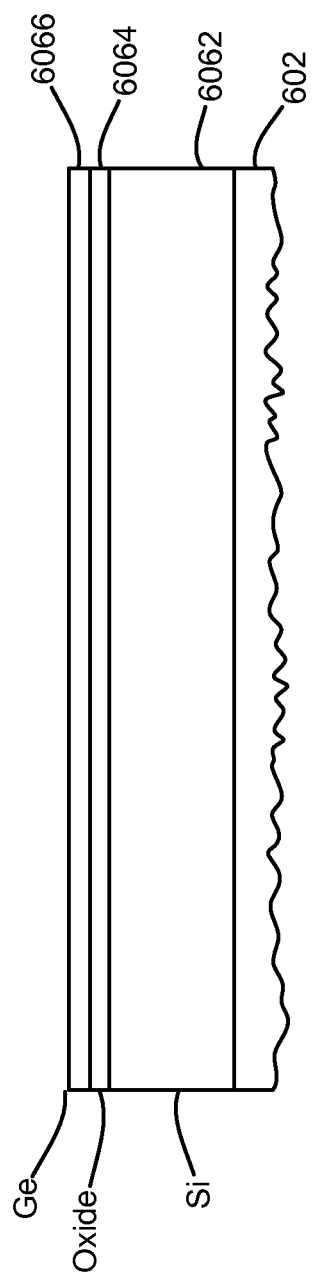

Regarding device structure 606, device structure 606 can comprise one or more layers. A method for formation of device structure 606 is described with reference to FIGS. 11-15. Referring to FIG. 11 a layer of silicon, Si, 6062 can be deposited onto insulating $SiO_2$ layer 602 to define a mass of waveguiding material. A thin layer of oxide 6064 can be deposited onto layer 6062. A layer 6066 of Germanium, Ge, or other photosensitive semiconductor can be deposited onto layer 6064 to define a mass of photosensitive material. The photosensitive semiconductor material for layer 6066 can absorb photons at a wavelength band to be detected and can convert the photons into electron hole pairs, which can be removed by application of an electric field for generation of a detectable current.

Figure 12:
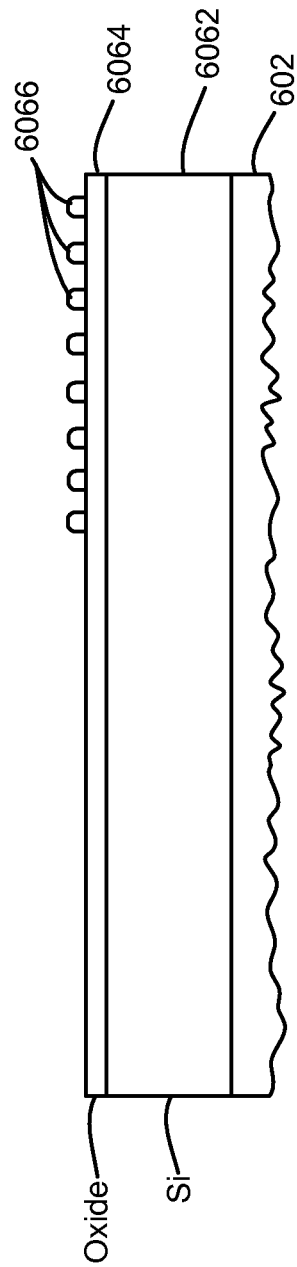

With oscilloscope 100 in the partially manufactured state as shown in FIG. 11, a photo or electron beam resist (e.g., a photo or electron beam resist) can be applied to over layer 6066 and the assembly can be subject to radiant energy to define the devices in the resist, then etching such as reactive-ion etching (RIE) can be used to transfer the pattern from the resist to the device material and to remove a portion of Germanium where the resist is not present so that the Germanium layer 6066 has the appearance as shown in FIG. 12 defining a plurality of photodetectors.

With the assembly in a state as shown in FIG. 12, another resist can be applied over the exposed portion of layers 6066 and 6064 and exposed to radiant energy for defining of the silicon devices then etching such as RIE can be used for removal of a portion of oxide layer 6064 and silicon, Si layer 6062. A resulting assembly can have the form as shown in FIG. 13, wherein defined by layer 6062 are a first section 6067 defining first and second dispersive elements 120, 140, second section 6068 defining four wave mixing optical element 200 and third section 6069 defining a portion of a spectrometer 302.

With the assembly in the state as shown in FIG. 13, insulator material 6061, e.g., $SiO_2$ can be deposited over the assembly to define a new assembly in the state as illustrated in FIG. 14. A resist can be applied over the assembly in the state as shown in FIG. 14 after depositing of the insulator material 6061 and the assembly can be subject to radiant energy to define vias 6063 extending through insulator material 6061 to the defined photodetectors defined by the remaining portion of germanium layer 6066. Vias 6063 can be filled with an electrical conductor, e.g., metal, to define electrical contacts 6065 (FIG. 10) accessible to an exterior of a completed photonic chip. Electrical contacts 6065 (FIG. 10) can define an electrical signal output and can output an electrical signal representative of an input waveform. With device structure 606 complete, insulator layer 608, comprising e.g., $SiO_2$ can be deposited over insulator material 6061 of structure 606. Regarding contacts 6065, a number of contacts can be scaled up to be at equal or greater than the ratio, R=record length/$\tau_{resolution}$ where $\tau_{resolution}$ is the instrument resolution of oscilloscope 100. It is seen that if the number of contacts is less than the ratio R, then an output resolution of oscilloscope 100 will be limited by a measurement resolution limit of spectrometer 302. Regarding oxide layer 6064, oxide layer can provide electrical isolation.

Figure 15:
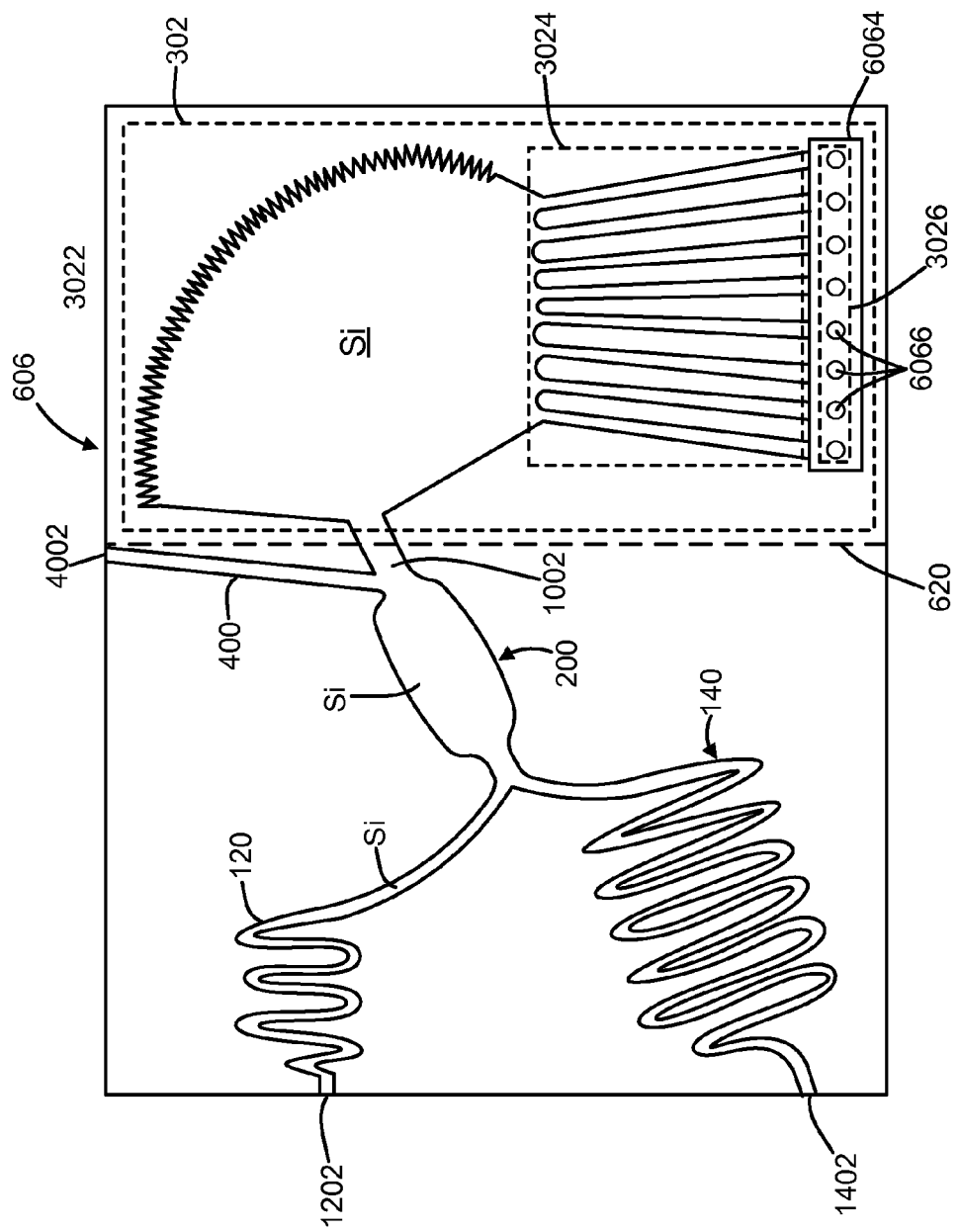
FIG. 15 is a top view of a device structure for a photonic chip incorporating an oscilloscope.

Referring to FIG. 15, a top view of the assembly in the state depicted by FIG. 13 is shown illustrating various elements of device structure 606. As seen in the top view of FIG. 15, there are defined first dispersive element 120 and second dispersive element 140, each defined by a semiconductor waveguide formed by the etching process described herein (comprising application of a resist and exposure to radiant energy including photons or electrons to define a device shape in the resist layer and then etching, e.g., by way of reactive ion etching (RIE) to transfer the pattern of the resist layer onto the device material and etch away the material not desired). There can also be defined in device structure 606 optical element 200, also defined by a semiconductor waveguide formed by the etching process described herein. In etching of layer 6062 for definition of various elements 120, 140, 200, dimensions and therefore dispersions of the various elements can be subject to control as set forth herein.

There can further be defined device structure 606 a detector unit, e.g., a spectrometer 302 or a portion thereof, including in the specific embodiment an optical grating 3022 for splitting a spectrum of an output waveform output by optical element 200, along with waveguide array 3024 for providing communication between grating 3022 and photodetector array 3026. Regarding grating 3022 and waveguide array 3024, grating 3022 and waveguide array 3024 can be formed by etching away of layer 6062 by way of etching process set forth herein. Regarding photodetector array 3026, photodetector 3026 can comprise photodetectors defined by etching away of layer 6066 as described herein.

Germanium, Ge, can be selected for layer 6066 as it is responsive to radiant energy in the telecommunication bands (including the S, C and L bands); however, another semiconductor material, e.g., Indium (III) nitride, gallium antimonide, lead (II), sulfide, etc. with bandgaps smaller than the telecommunication bands can be selected. Another photo sensitive material for photodetector array 3026 can be selected if an output waveform output by optical element 100 is output at a band outside of the telecommunication band. Further regarding device structure 606, there can be included output dispersive element 400 defined by a photonic waveguide formed by the etching process set forth herein. Output dispersive element 400 defines an optical output 4002 accessible from an exterior of the oscilloscope 100.

Regarding layer 6062 described as being provided by Silicon, Si, a semiconductor, layer 6062 can be provided by another suitable waveguiding material. Waveguiding material layer 6062 can be provided by any waveguiding material that can function as a Kerr nonlinear medium, including an insulator material, e.g., silicon nitride, silicon oxynitride. Waveguiding material layer 6062 can in general include other types of glasses (e.g., silica, chalcogenide) and other types of semiconductor material.

Regarding insulator material 6061, insulator material 6061 can be replaced with another substance, e.g., air, having an index of refraction less than that of the waveguiding material forming layer 6062.

Additional dispersive material can be coupled at output 4002 to increase a dispersion of dispersive optical element 400. At a distal end (e.g., at output 4002 or at a termination of the additional dispersive material) of dispersive element 400 there can be coupled a photodetector 304 for detecting an output waveform in the time domain.

In one embodiment, there is set forth herein in etching of layer 6062 for definition of various elements 120, 140, 200, dimensions and therefore dispersions of the various elements can be subject to control as set forth herein. There is set forth herein in one specific implementation of the photonic chip embodiment described with reference to FIGS. 10-15, an apparatus for generating a representation of an input waveform, the apparatus including a first dispersive element 120 through which the input waveform propagates, a waveguide 200 also formed by etching of the mass of waveguiding material, the waveguide 200 having a zero-group-velocity dispersion point in the C telecommunications band and a dispersion yielding a conversion bandwidth of greater than 100 nm, wherein the waveguide 200 is configured to output an output waveform; a pump pulse input unit for input of a pump pulse into the waveguide 200, the pump pulse input unit being coupled to the waveguide, the pump pulse input unit having a second dispersive element 140 through which the pump pulse propagates, the second dispersive element 140 also being formed by etching of the mass of waveguiding material; wherein the apparatus is configured so that each of the input waveform the pump pulse and the output waveform are within the S, C, and L telecommunication bands; wherein the first dispersive element 120 and the second dispersive element 140 are configured by way of appropriate dimensioning so that a dispersion of the first dispersive element is matched with a dispersion of the second dispersive element; wherein the apparatus is configured so that the input waveform which can be input into input 1202 and the pump pulse which can be input into input 1402 are combined by four wave mixing at the waveguide 200 so that the output waveform is phase shifted relative to the input waveform; and wherein the apparatus is configured to that the peak optical power inside the waveguide 200 is maintained below 100 mW.

In another embodiment of a semiconductor chip as set forth herein, a semiconductor chip can be formed to be devoid of the elements to the right of dashed line 620 and to comprise only elements to the left of dashed line 620. In such a formed semiconductor chip a first optical output 1002 can be defined at a distal end of optical element 1002 and a second optical output 4002 can be defined at a distal end of output dispersive element 400. A spectrometer 302 external to the chip can be coupled to output 1002 for detection of the output waveform in the frequency domain. A photodetector 304 (possibly with use of additional dispersive material between output 4002 and photodetector 304) can be coupled to output 4002 for detection of an output waveform in the frequency domain.

Certain features of an optical element for combining an input waveform and a pump pulse have been described herein. As described herein in one embodiment, an optical element for combining an input waveform and pump pulse by way of four wave mixing can comprise a semiconductor waveguide. Use of semiconductor waveguide material is power efficient, and allows negative effects such as self phase modulation (SPM) and free carrier generation to be avoided. In one embodiment optical element 200 can comprise a semiconductor waveguide and can be configured to have strong optical confinement and dispersion that can yield conversion bandwidths greater than 100 nm. In another aspect, optical element 200 can include a dispersion point in the C telecommunications band.

An excerpted section of U.S. Provisional Patent Application No. 61/105,217 filed Oct. 14, 2008, entitled Semiconductor-Based Ultrafast Optical Oscilloscope, which is incorporated herein by reference in its entirety, is presented herein below, reformatted to accommodate formatting rules associated with the present application and to avoid duplication of figure numbers.

[Beginning of excerpted section of U.S. Provisional Patent Application No. 61/105,217 filed Oct. 14, 2008, entitled Semiconductor-Based Ultrafast Optical Oscilloscope]

Regarding a field of the invention, the invention relates to an optical system in general and specifically to optical systems for use in measuring characteristics of an input waveform.

Regarding a background of the invention, measuring a waveform in the time domain requires ultrafast optical sensors. The best sensors are only capable of measuring intervals of 25+ picoseconds. In the frequency domain, however, all frequencies comprising the waveform can be measured in a single shot, by using a dispersive element (such as a lens) to scatter the waveform among an array of sensors. This invention, by transforming the waveform from the time to the frequency domain enables an ultrafast oscilloscope with a resolution of 100 fs, 20× better than state of the art machines costing $250-500 k.

Regarding a summary of the invention, this device enables measurement of optical waveforms with better than 100 femtosecond resolution over a record length larger than 100 ps. Furthermore, this device can measure waveforms in a single shot. The device can utilize a time lens based on four-wave mixing in semiconductor waveguides. The cross-sectional area of the waveguide in the device can be designed in order to produce appropriate dispersion to allow for conversion bandwidths >100 nm. The device can include a dispersive element in which the signal passes through a length of dispersive waveguide and then combines with a pump pulse which is dispersed by passing a dispersive element that is twice as dispersive as that of the signal through twice the length of dispersion. The dispersion could result from any dispersive element i.e. optical fiber, semiconductor waveguides, fiber Bragg gratings, free-space gratings, prism, etc. The combined waves can undergo wavelength conversion based on four-wave mixing in the appropriately scaled waveguides. The spectrum of the converted signal can be measured using a spectrometer to retrieve the temporal shape of the signal. The principle of operation can be based on using the four-wave mixing as a temporal lens. The signal can travel one focal length worth of dispersion and then travel through the temporal lens. The spectrum then contains the Fourier transform of the input signal's spectrum, which is the input signal's temporal profile. In principle, using semiconductor fabrication technology, all the components can be integrated onto a single, chip-scale device.

Figure 16:
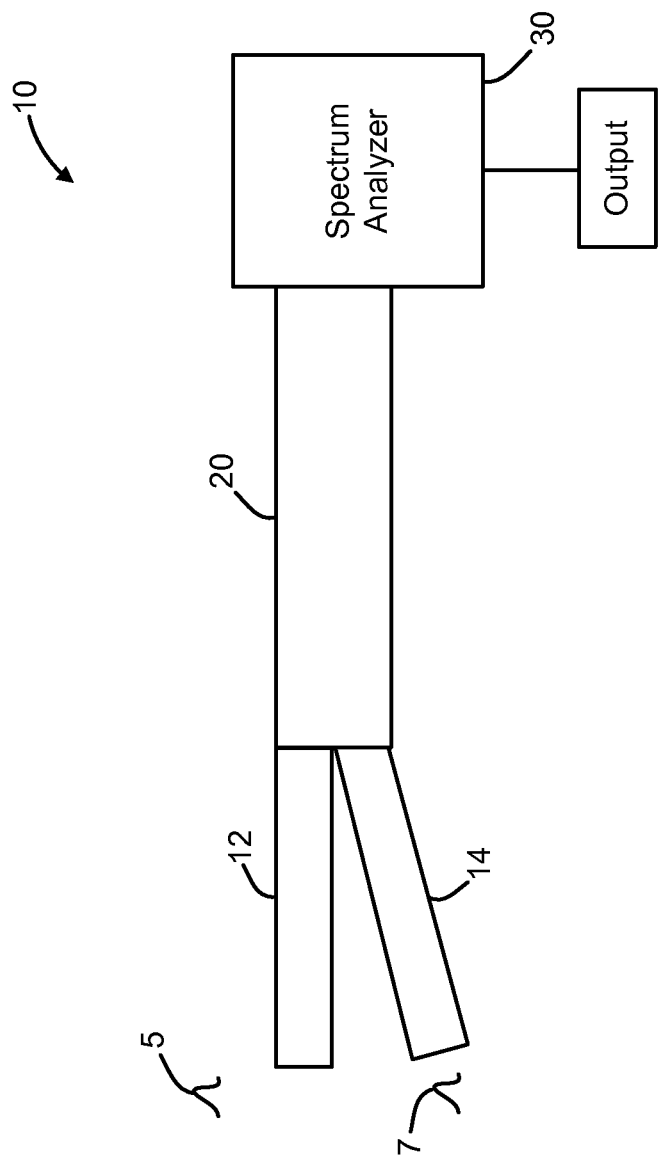
FIG. 16 is a diagram of an oscilloscope in one embodiment.

Regarding a brief description of the drawing, FIG. 16 is a schematic diagram of a waveform analysis apparatus comprising a temporal lens for stimulating four-wave mixing of a dispersed input waveform and a dispersed pump pulse.

Regarding an illustrative example of the invention, there is described an optical waveform analysis apparatus in which an input optical waveform is subject to dispersion and stimulated four-wave mixing to output a converted multicolor waveform. The converted multicolor waveform can be input to a spectrum analyzer, and the measured spectrum directly yields the input optical waveform expressed in the time domain after scaling with the time-to-frequency conversion factor.

An example of a waveform analysis apparatus 10 according to the present description is shown in FIG. 16. Apparatus 10 can include a first dispersive element 12 for receipt of an input waveform 5, a second dispersive element 14 for receipt of a pump pulse 7, and a temporal lens 20, in which four wave mixing is stimulated. In temporal lens 20 there can be stimulated four-wave mixing of the input waveform 5 (after it is dispersed) and the pump pulse 7 (after it is dispersed by second dispersion element 14).

Regarding first dispersive element 12 and second dispersive element 14 in one embodiment, first dispersive element 12 can be adapted so that input waveform 5 travels one focal length of dispersion prior to reaching temporal lens 20 and second dispersive element 14 can be adapted so that second dispersive element 12 is twice as dispersive as first dispersive element 12 through twice the length of dispersion. Dispersion characteristics of first dispersive element 12 and second dispersive element 14 can be selected based on characteristics of temporal lens 20 and can be varied as characteristics of temporal lens 20 are changed.

First dispersive element 12 and/or second dispersive element 14 can be provided e.g., optical fibers, semiconductor waveguides, fiber Bragg gratings, free space gratings, prisms and the like.

Temporal lens 20 can output a converted color separated waveform which can be presented to spectrum analyzer 30. The spectrum measured by spectrum analyzer 30 is a direct measurement of the time domain amplitude of the signal. The wavelength axis can be converted to the corresponding temporal position using a calibrated time-to-frequency conversion factor. Outputs having resolutions of above 100 fs are achievable.

A small sample of systems methods and apparatus that are described herein is as follows:

(A1.) A method for generating a high resolution time domain representation of an input waveform comprising: dispersing the input waveform to generate a dispersed input waveform; subjecting the dispersed input waveform to four wave mixing by combining the dispersed input waveform with a dispersed pump pulse to generate a converted waveform; and presenting the converted waveform to a spectrum analyzer for recording of the converted waveform.

(B1.) An apparatus for generating a high resolution time domain representation of an input waveform said apparatus comprising: a first dispersive element having an input end for receipt of said input waveform and an output end; a second dispersive element having an input end for receipt of a pump pulse and an output end; a temporal lens coupled to said output ends of each of said first dispersive element and said second dispersive element for stimulating four wave mixing of said input waveform after being dispersed by said first dispersive element; and a spectrum analyzer receiving an output of said temporal lens.

(C1.) A temporal lens comprising an input section and an output section, the input section receiving a dispersed input waveform and a dispersed pump pulse in such manner that four-wave mixing is stimulated, the output section outputting a converted waveform to a spectrum analyzer for recovery of said input waveform.

Details of and variations of the described apparatus and related apparatus and methods are set forth in the following Description: (A) Silicon-chip-based ultrafast optical oscilloscope.

A. Silicon-Chip-Based Ultrafast Optical Oscilloscope

With the realization of faster telecommunication data rates and an expanding interest in ultrafast chemical and physical phenomena, it has become important to develop techniques that enable simple measurements of optical waveforms with subpicosecond resolution [Dorrer, C. High-speed measurements for optical telecommunication systems, IEEE Select. Topics Quant Electron. 12, 843-858 (2006)]. State-of-the-art oscilloscopes with high-speed photodetectors provide single-shot waveform measurement with 30-ps resolution. Although multiple-shot sampling techniques can achieve few-picosecond resolution, single-shot measurements are necessary to analyse events that are rapidly varying in time, asynchronous, or may occur only once. Further improvements in single-shot resolution are challenging, owing to microelectronic bandwidth limitations. To overcome these limitations, researchers have looked towards all-optical techniques because of the large processing bandwidths that photonics allow. This has generated an explosion of interest in the integration of photonics on standard electronics platforms, which has spawned the field of silicon photonics [Jalali, B. Can silicon change photonics? Phys. Status Solidi 205, 213-224 (2008)] and promises to enable the next generation of computer processing units and advances in high-bandwidth communications.

For the success of silicon photonics in these areas, on-chip optical signal-processing for optical performance monitoring will prove critical. Beyond next generation communications, silicon compatible ultrafast metrology would be of great utility to many fundamental research fields, as evident from the scientific impact that ultrafast measurement techniques continue to make [Dudley, J. M., Finot, C., Richardson, D. J. & Millot, G. Self-similarity in ultrafast nonlinear optics. Nature Phys. 3.597-603 (2007); Solli, D. R., Ropers, C., Koonath, P. & Jalali, B. Optical rogue waves. Nature 450, 1054-1057 (2007)]. Here, using time-to-frequency conversion [Kauffman, M. Banyal, W. C., Godil, A. A. & Bloom, D, M. Time-to-frequency converter for measuring picosecond optical pulses. Appl. Phys. Lett. 64, 270-272 (1994)] via the nonlinear process of four-wave mixing on a silicon chip, we demonstrate a waveform measurement technology within a silicon-photonic platform. We measure optical waveforms with 220-fs resolution over lengths greater than 100 ps, which represent the largest record-length-to-resolution ratio (>450) of any single-shot-capable picosecond waveform measurement technique [Kauffman, M. T., Banyal, W. C., Godil, A. A. & Bloom, D. M. Time-to-frequency converter for measuring picosecond optical pulses. Appl. Phys. Lett. 64, 270-272 (1994); Bennett, C. V., Scott, R. P. & Kolner, B. H. Temporal magnification and reversal of 100 Gb/s optical data with an upconversion timemicroscope. Appl. Phys. Lett. 65, 2513-2515 (1994); Bennett, C. V. & Kolner, B. H. Upconversion timemicroscope demonstrating 1033 magnification of femtosecond waveforms. Opt. Lett. 24, 783-785 (1999); Mouradian, L. K., Louradour, F., Messager, V., Barthelemy, A. & Froehly, C. Spectro-temporal imaging of femtosecond events. IEEE J. Quant. Electron. 36, 795-801 (2000); Azana, J., Berger, N. K., Levit, B. & Fischer, B. Spectral Fraunhofer regime: Time-to frequency conversion by the action of a single time lens on an optical pulse. Appl. Opt, 43, 483-490 (2004); Fernandez-Pousa, C. R. Temporal resolution limits of time-to-frequency transformations. Opt. Lett. 31, 3049-3051 (2006); Bennett, C. V., Moran, B. D., Langrock, C., Fejer, M. M. & Ibsen, M. 640 GHz real time recording using temporal imaging. In Conference on Lasers and Electro-Optics [CD] paper CtuA6 (OSA Technical Digest Series, Optical Society of America, (2008); Kan'an, A. M. & Weiner, A. M. Efficient time-to-space conversion of femtosecond optical pulses. J. Opt. Soc. Am. B 15, 1242-1245 (1998); Oba, K., Sun, P. C., Mazurenko, Y. T. & Fainman, Y. Femtosecond single-shot correlation system: A time-domain approach. Appl. Opt. 38, 3810-3817 (1999); Chou, J., Boyraz, O. & Jalali, B. Femtosecond real-time single-shot digitizer. Appl. Phys. Lett. 91, 161105 (2007); Bromage, J., Dorrer, C., Begishev, I. A., Usechak, N. G. & Zuegel, J. D. Highly sensitive, single-shot characterization for pulse widths from 0.4 to 85 ps using electro-optic shearing interferometry. Opt. Lett. 31, 3523-3525 (2006)]. Our implementation allows for single-shot measurements and uses only highly developed electronic and optical materials of complementary metal-oxide semiconductor (CMOS)-compatible silicon-on-insulator technology and single-mode optical fiber. The mature silicon-on-insulator platform and the ability to integrate electronics with these CMOS compatible photonics offer great promise to extend this technology into commonplace bench-top and chip-scale instruments.

Several established nonlinear optical techniques [Kane, D. J. & Trebino, R. Single-shot measurement of the intensity and PHASE of an arbitrary ultrashort pulse by using frequency-resolved optical gating. Opt. Lett. 18, 823-825 (1993); Dorrer, C. et al. Single-shot real-time characterization of chirped-pulse amplification systems by spectral PHASE interferometry for direct electric-field reconstruction. Opt. Lett. 24, 1644-1646 (1999)] exist to measure optical waveforms with few-femtosecond accuracy, but have limited single-shot record lengths of tens of picoseconds and limited update rates. To span the temporal region between electronic measurement and these methods, and to allow for rapidly updateable direct optical detection, techniques have been developed using the space-time duality of electromagnetic waves and related phenomena [Kauffman, M. T., Banyal, W. C., Godil, A. A. & Bloom, D. M. Time-to-frequency converter for measuring picosecond optical pulses. Appl. Phys. Lett. 64, 270-272 (1994); Bennett, C. V., Scott, R. P. & Kolner, B. H. Temporal magnification and reversal of 100 Gb/s optical data with an upconversion timemicroscope Appl. Phys. Lett. 65, 2513-2515 (1994); Bennett, C. V. & Kolner, B. H. Upconversion timemicroscope demonstrating 1033 magnification of femtosecond waveforms. Opt. Lett. 24, 783-785 (1999); Mouradian, L. K., Louradour, F., Messager, V., Barthelemy, A. & Froehly, C. Spectro-temporal imaging of femtosecond events. IEEE J. Quant. Electron. 36, 795-801 (2000); Azana, J., Berger, N. K, Levit, B. & Fischer, B. Spectral Fraunhofer regime: Time-to frequency conversion by the action of a single time lens on an optical pulse. Appl. Opt, 43, 483-490 (2004); Fernandez-Pousa, C. R. Temporal resolution is of time-to-frequency transformations. Opt. Lett. 31, 3049-3051 (2006); Bennett, C. V., Moran, B. D., Langrock, C., Fejer, M. M. & Ibsen, M. 640 GHz, real time recording using temporal imaging. In Conference on Lasers and Electro-Optics [CD] paper CtuA6 (OSA Technical Digest Series, Optical Society of America, (2008); Kan'an, A. M. & Weiner, A. M. Efficient time-to-space conversion of femtosecond optical pulses. J. Opt. Soc. Am. B 15, 1242-1245 (1998); Oba, K., Sun, P. C., Mazurenko, Y. T. & Fainman, Y. Femtosecond single-shot correlation system: A time-domain approach. Appl. Opt. 38, 3810-3817 (1999); Chou, J., Boyraz, O. & Jalali, B. Femtosecond real-time single-shot digitizer. Appl. Phys. Lett. 91, 161105 (2007); Bromage, J., Dorrer, C., Begishev, I. A., Usechak, N. G. & Zuegel, J. D. Highly sensitive, single-shot characterization for pulse widths from 0.4 to 85 ps using electro-optic shearing interferometry. Opt. Lett. 31, 3523-3525 (2006)]. This duality relies on the equivalence between the paraxial wave equation, which governs diffractive propagation of a spatial field, and the scalar wave equation, which governs dispersive propagation of a temporal field [Akhmanov, S. A., Vysloukh, V. A. & Chirkin, A. S. Self-action of wave packets in a nonlinear medium and femtosecond laser pulse generation. Sov. Phys. Usp. 29, 642-677 (1986); Kolner, B. H. Space-time duality and the theory of temporal imaging. IEEE J. Quant. Electron. 30, 1951-4963 (1994)]. The duality implies that spatial optical components such as a lens or prism have temporal counterparts known as a time-lens or time-prism, which can be implemented by imparting a quadratic or linear temporal phase shift, respectively, on the temporal field [Akhmanov, S. A., Vysloukh, V. A. &. Chirkin, A. S. Self-action of wave packets in a nonlinear medium and femtosecond laser pulse generation. Sov. Phys, Usp. 29, 642-677 (1986); Kolner, B. H. Space-time duality and the theory of temporal imaging. IEEE J. Quant. Electron. 30, 1951-1963 (1994)]. Furthermore, these components allow for temporal processing in a manner analogous to that of the spatial counterparts, such as temporal-imaging of the waveform.

Two methods using the space-time duality can be applied to measure ultrafast optical waveforms. Much like a spatial lens can magnify an image, a temporal lens can lengthen an ultrafast waveform in time, allowing for measurement using a photodetector and an oscilloscope that would have insufficient temporal resolution for the unmagnified waveform. This technique is known as temporal magnification [Bennett, C. V., Scott, R. P. & Kolner, B. H. Temporal magnification and reversal of 100 Gb/s optical data with an upconversion time microscope. Appl. Phys. Lett. 65, 2513-2515 (1994); Bennett, C. V. & Kolner, B. H. Upconversion timemicroscope demonstrating 1033 magnification of femtosecond waveforms. Opt. Lett. 24, 783-785 (1999); Bennett, C. V., Moran, B. D., Langrock, C., Fejer, M. M. & Ibsen, M. 640 GHz real time recording using temporal imaging. In Conference on Lasers and Electro-Optics [CD] paper CtuA6 (OSA Technical Digest Series, Optical Society of America, 2008)]. The second measurement method utilizes the Fourier property of a lens [Goodman., J. W. Introduction to Fourier Optics (McGraw-Hill, 1968)]—an object positioned at the front focal plane of a lens will produce a Fourier transform of the object at the back focal plane (FIG. 17a). As the Fourier transform of a temporal waveform is its optical spectrum, extending the spatial Fourier processor to the temporal domain yields a device that converts the temporal (spectral) profile of the input to the spectral (temporal) profile of the output (FIG. 17b). Thus, a measurement of the spectrum at the Fourier plane directly yields the temporal amplitude of the incident waveform, and this process is termed time-to-frequency conversion [Kauffman, M. T., Banyal, W. C., Godil, A. A. & Bloom, D. M. Time-to-frequency converter for measuring picosecond optical pulses. Appl. Phys. Lett. 64, 270-272 (1994)].

The phase shift for temporal imaging devices is typically applied using an electro-optical phase modulator, but an alternative scheme can be realized by using a parametric nonlinear wave-mixing process such as sum-frequency generation and difference-frequency generation. This latter technique is called parametric temporal imaging [Bennett, C. V. & Kolner, B. H. Principles of parametric temporal imaging—Part I: System configurations. IEEE J. Quant, Electron. 36, 430-437 (2000)], and consists of wave-mixing with a linearly-chirped pump yielding a converted waveform that is nearly equivalent to the signal waveform with a linear frequency chirp or equivalently a quadratic phase shift as required for a time-lens. Parametric time-lenses have phase-shifts in excess of 100π, which is significantly larger than the 10 p maximally possible using an electro-optical phase modulator and therefore greatly extend the applications of temporal imaging systems. A drawback of using the sum-frequency generation and difference-frequency generation second-order nonlinear processes is that only a narrow range of materials possess a second-order nonlinear moment, and the converted waveform is inherently generated at widely different wavelengths from that of the pump or input signal. Waveform measurement based on temporal magnification using difference frequency generation has yielded promising results, including single-shot measurement of ultrafast waveforms with a resolution of less than 900 fC for a simultaneous record length of 100 ps. [Bennett, C. V., Moran, B. D., Langrock, C., Fejer, M. M. & Ibsen, M. 640 GHz real time recording using temporal imaging, in Conference on Lasers and Electro-Optics [CD] paper CtuA6 (OSA Technical Digest Series, Optical Society of America, (2008)]. Waveform measurements based on time-to-frequency conversion using electro-optic modulation have demonstrated a resolution of 3 ps over a 31-ps record length using multiple-shot averaging [Kauffman, M. T., Banyal, W. C., Godil, A. A. &. Bloom, D. M. Time-to-frequency converter for measuring picosecond optical pulses. Appl. Phys. Lett. 64, 270-272 (1994)].

Here we demonstrate a parametric time-lens based on the third order nonlinear process of four-wave mixing (FWM), and apply this time-lens to the creation of a silicon-chip-based ultrafast optical oscilloscope. As our device is based on the third-order Kerr nonlinearity, the FWM-based time-lens can be implemented in any material platform, including the CMOS-compatible silicon-on-insulator (SOI) photonic platform used here. The output of this time-lens is generated at a wavelength close to those of the pump and input waves, enabling all the interacting waves to be in the S, C and L telecommunications bands, for example, which allows for the manipulation of all the waves using the well-established instrumentation and components available for these bands. Using our device, we perform measurements of highly complex waveforms with 220-fs resolution over record lengths larger than 100 ps. The combination of this 220-fs resolution and greater than 100-ps record length represents the largest RECORD-length-to-resolution ratio (>450) of any single-shot-capable waveform measurement technique for the picosecond time range [Kauffman, M. T., Banyal, W. C., Godil, A. A. & Bloom, D. M. Time-to-frequency converter for measuring picosecond optical pulses. Appl. Phys. Lett. 64, 270-272 (1994); Bennett, C. V., Scott, R. P. & Kolner, B. H. Temporal magnification and reversal of 100 Gb/s optical data with an upconversion timemicroscope. Appl. Phys. Lett. 65, 2513-2515 (1994); Bennett, C. V. & Kolner, B. H. Upconversion timemicroscope demonstrating 1033 magnification of femtosecond waveforms. Opt. Lett. 24, 783-785 (1999): Mouradian, L. K., Louradour, F., Messager, V., Barthelemy, A. & Froehly, C. Spectro-temporal imaging of femtosecond events, IEEE J. Quant, Electron. 36, 795-801 (2000); Azana, J Berger, N. K., Levit, B. & Fischer, B. Spectral Fraunhofer regime: Time-to frequency conversion by the action of a single time lens on an optical pulse. Appl. Opt. 43, 483-490 (2004); Fernandez-Pousa, C. R. Temporal resolution limits of time-to-frequency transformations. Opt. Lett. 31, 3049-3051 (2006); Bennett, C. V., Moran, B. D., Langrock, C., Fejer, M. M. & Ibsen, M. 640 GHz real time recording using temporal imaging. In Conference on Lasers and Electro-Optics [CD] paper CtuA6 (OSA Technical Digest Series, Optical Society of America, (2008); Kan'an, A. M. & Weiner, A. M. Efficient time-to-space conversion of femtosecond optical pulses. J. Opt. Soc. Am. B 15, 1242-4245 (1998); Oba, K., Sun, P. C. Mazurenko, Y. T. & Fainman, Y. Femtosecond single-shot correlation system: A time-domain approach. Appl. Opt. 38, 3810-3817 (1999); Chou, J., Boyraz, O. & Jalali, B. Femtosecond real-time single-shot digitizer, Appl. Phys. Lett. 91, 161105 (2007); Bromage, J., Dorrer, C., Begishev, I. A., Usechak, N. G. & Zuegel, J. D. Highly sensitive, single-shot characterization for pulse widths from 0.4 to 85 ps using electro-optic shearing interferometry. Opt. Lett. 31, 3523-3525 (2006)]. Furthermore, unlike commonly used techniques such as frequency-resolved optical gating [Kane, D. J. & Trebino, R. Single-shot measurement of the intensity and phase of an arbitrary ultrashort pulse by using frequency-resolved optical gating. Opt. Lett. 18, 823-825 (1993)] and spectralphaseinterferometry for direct electric-field reconstruction [Bromage, J., Dorrer, C., Begishev, I. A., Usechak, N. G. & Zuegel, J. D. Highly sensitive, single-shot characterization for pulse widths from 0.4 to 85 ps using electro-optic shearing interferometry. Opt. Lett. 31, 3523-3525 (2006); Dorrer, C. et al. Single-shot real-time characterization of chirped-pulse amplification systems by spectral PHASE interferometry for direct electric-field reconstruction. Opt. Lett. 24, 1644-1646 (1999), our implementation directly measures the temporal amplitude profile using no reconstruction algorithm, allowing for rapidly updateable single-shot measurements.

We test the capability of the silicon-chip-based ultrafast optical oscilloscope with various input waveforms. Each input waveform enters the device and passes through a dispersive element consisting a length of optical fiber. To match to the focal length of the FWM timelens, the input wave is mixed with a pump pulse that passes through twice the dispersive length of optical fiber. After passing through the optical fiber, the pump pulse and test waveform are combined and FWM is carried out in an SOI nanowaveguide. The strong optical confinement of these silicon structures allows for highly efficient nonlinear processes and for engineerable group-velocity dispersion that can yield conversion bandwidths greater than 150 nm with broad pump tunability [Dulkeith, E., Xia, F., Schares, L., Green, W. M. J. & Vlasov, Y. A. Group index and group velocity dispersion in silicon-on-insulator photonic wires. Opt. Express 14, 3853-3863 (2006); Turner, A. C. et al. Tailored anomalous group-velocity dispersion in silicon channel waveguides. Opt. Express 14, 4357-4362 (2006); Foster, M. A. et al. Broad-band optical parametric gain on a silicon photonic chip. Nature 441, 960-963 (2006); Lin, Q., Zhang, J., Fauchet, P. M. & Agrawal, G. P. Ultrabroadband parametric generation and wavelength conversion in silicon waveguides. Opt. Express 14, 4786-4799 (2006); Foster, M. A., Turner, A. C., Salem, R., Lipson, M. & Gaeta, A. L. Broad-band continuous-wave parametric wavelength conversion in silicon nanowaveguides. Opt. Express 15, 12949-12958 (2007)]. The resulting FWM-generated spectrum is measured using an optical spectrometer to determine the temporal profile of the input.

The pump-pulse bandwidth and the length of the dispersive path determine the RECORD length and resolution of the oscilloscope. The time-to-frequency conversion factor for the FWM-based converter is given by $$\frac{\Delta t}{\Delta \omega} = -\beta_2 L \quad (1)$$

where $\Delta t$ is the temporal shift of the input signal, $\Delta \omega$ is the resulting spectral shift, $\beta_2$ is the group-velocity dispersion parameter, and L is the length of the dispersive signal path. For our system, this relation yields a 1-nm shift in converted wavelength for a 5.2-ps shift in temporal position. Using FWM, we can convert a narrow-band signal over twice the pump bandwidth, which yields the approximate record length $\tau_{RECORD}$ for the FWM-based oscilloscope $\tau_{RECORD}$ for the FWM-based oscilloscope $$\tau_{RECORD} = 2\beta_2 L \Omega_{pump} \quad (2)$$

where $\Omega_{pump}$ is the spectral bandwidth of the pump pulse. The resolution of the oscilloscope is predicted by considering the transfer of a temporal delta function through the instrument's system. This impulse response is precisely the temporal resolution $\tau_{resolution}$ of the instrument and is given by $$\tau_{resolution} = \frac{\tau_{pump}}{\sqrt{2}} \quad (3)$$

where $\tau_{pump}$ is the pump pulsewidth. For our system, these relationships predict a record length of 150 ps and a resolution of 200 fs. Practically, the separation between the pump and signal and the FWM conversion bandwidth will limit the record length. Deviation from a quadratic phase on the pump pulse, such as that resulting from third-order dispersion, the FWM conversion bandwidth, and the spectral resolution of the spectrometer will also determine the temporal resolution. Since the FWM conversion bandwidth limits both the record length and the resolution, it is important to maximize this value. The silicon waveguides used in our implementation have sufficiently large conversion bandwidths (>150 nm) Foster, M. A. Turner, A. C., Salem, R., Lipson, M, & Gaeta, A, L. Broad-band continuous-wave parametric wavelength conversion in silicon nanowaveguides. Opt. Express 15, 12949-12958 (2007)] to allow the performance of the ultrafast optical oscilloscope to be solely limited by the aberrations caused by third-order dispersion and the spectrometer performance.

Figure 18:
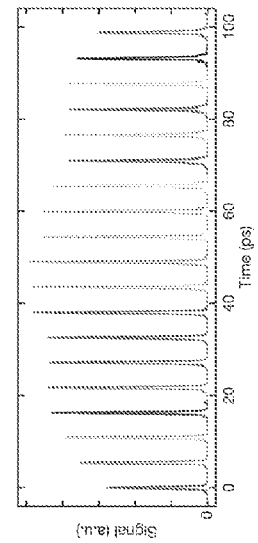
FIG. 18 is a diagram characterizing a resolution and a record length of a record output with use of an oscilloscope.

We experimentally characterize the record length and resolution of our system by injecting a 342-fs pulse and varying its temporal position. As shown in FIG. 18, we are able to measure the pulse position across a record length of 100 ps. To characterize the resolution of the FWM-based oscilloscope, we deconvolve the temporal resolution from the average observed width of this pulse across the record length of the device. We measure an average pulse width of 407 fs, which, when compared to the actual pulse width of 342 fs, indicates a temporal resolution of 220 fs for our implementation.

We further investigate the measurement capabilities of the silicon chip-based oscilloscope by generating test waveforms of varying complexity. First, we measure a pulse which has undergone nonlinear spectral broadening and dispersion using an ultrafast optical oscilloscope that exhibits 450-fs resolution and a 100-ps record length. The measurement of this pulse using an ultrafast optical oscilloscope compared to a cross-correlation is shown in FIG. 19a. We measure an optical waveform of even greater complexity by generating a 120-ps waveform with 900-fs temporal features. We measure this waveform using the silicon-chip-based ultrafast optical oscilloscope with 220-fs resolution. The results of this measurement and a comparison to cross-correlation are shown in FIG. 19b. The test waveforms in FIGS. 19a, 19B are derived from the same laser source as the pump pulse. We demonstrate that the ultrafast optical oscilloscope can also be used to perform measurements of waveforms from a separate source by synchronizing a variable-pulse-width time lens-compressed laser source [Dorrer, C. et al. Single-shot real-time characterization of chirped-pulse amplification systems by spectral phase interferometry for direct electric-field reconstruction. Opt. Lett. 24, 1644-1646 (1999)] with a repetition rate of 9.6 GHz with the ultrafast fiber laser pump source operating at 36 MHz. Using the device with 220-fs resolution, we optimize the pulse-width of the 9.6-GHz source by observing it compress a 30-ps pulse with 30-mW peak power to a 6-ps pulse with 150-mW peak power. The results of this optimization using the ultrafast optical oscilloscope compared to cross-correlation are shown in FIG. 19c.

Lastly, we demonstrate the single-shot capability of the device by incorporating a single-shot spectrometer. We measure three single shot optical waveforms composed of two pulses with temporal separations of 86 ps, 27 ps, and nearly temporally overlapped. The results of these single-shot measurements compared with a multiple shot cross-correlation are shown in FIG. 19d. As shown by the 86-ps separation, we maintain the 100-ps record length. When the pulses overlap, we observe temporal interference fringes with a 3-ps period. For this implementation, the temporal resolution is limited to 766 fs per pixel, or a record-length-to-resolution ratio of 130, by the infrared camera. High dynamic range linear arrays with more than 1,000 pixels are commercially available, and would allow for utilization of the full (>450) record-length-to-resolution ratio of our device.

Ultimately, the dynamic range for single-shot measurements is limited by the maximum power allowed in the silicon nanowaveguide while avoiding self-phase modulation and free-carrier generation [Dorrer, C. et al. Single-shot real-time characterization of chirped-pulse amplification systems by spectral PHASE interferometry for direct electric-field reconstruction. Opt. Lett. 24, 1644-1646 (1999)], and by the minimum detectable power per pixel. These constraints should limit the range of signal peak power at the time lens from 100 µW to 100 mW, which corresponds to a dynamic range of 103 [Dudley, J. M., Finot, C., Richardson, D. J. & Millot, G. Self-similarity in ultrafast nonlinear optics. Nature Phys. 3, 597-603 (2007)]. The maximum power into the ultrafast optical oscilloscope is dependent on the feature width, as a narrow temporal feature will spread during dispersive propagation before the lens and therefore the peak power at the lens is significantly lower. If resolution-limited temporal features are considered, a 40 W peak power is allowed, which corresponds to a dynamic range of 105 [Solli, D. R. Chou, J. & Jalali, B. Amplified wavelength-time transformation for real-time spectroscopy. Nature Photon. 2, 48-51 (2008)]. Furthermore, because the minimum detectable power depends on the desired single-shot resolution while the maximum power does not, higher dynamic range measurements are possible in this system at reduced resolution.

In all of our measurements, we observe good agreement between our silicon-based ultrafast optical oscilloscope and the cross-correlation with a 280-fs pulse. Nevertheless some deviations are observed, which partially result from the slightly different lengths (less than 3 m variation) of optical fiber used to synchronize the arrival time of the waveforms and pump pulses to the cross-correlator as compared to the oscilloscope. Further inconsistencies are probably due to pump pulse imperfections in the FWM time-lens. For optimal performance, care must be taken to obtain a clean and flat spectral amplitude and phase for the pump pulse. Moreover, the resolution is ultimately limited by the aberrations arising from third-order dispersion in the dispersive elements. The use of dispersion-flattened fiber or dispersion engineered waveguides [Dulkeith, E., Xia, F., Schares, L., Green, W. M. J. & Vlasov, Y. A. Group index and group velocity dispersion in silicon-on-insulator photonic wires. Opt. Express 14, 3853-3863 (2006); Turner, A. C. et al. Tailored anomalous group-velocity dispersion in silicon channel waveguides. Opt. Express 14, 4357-4362 (2006)] in the dispersive paths would alleviate this aberration, and provide a path towards sub-100-fs resolution by using a sub-100-fs pump pulse.

The components of this measurement system can potentially be entirely integrated on-chip. Specifically, the integration of a pulsed laser source [Koch, B. R., Fang, A. W., Cohen, O. & Bowers, J. E. Mode-locked silicon evanescent lasers. Opt. Express 15, 11225-11233 (2007)], low-loss dispersion engineered waveguides for the dispersive paths [Dulkeith, E., Xia, F., Schares, L., Green, W. M. J. & Vlasov, Y. A. Group index and group velocity dispersion in silicon-on-insulator photonic wires. Opt. Express 14, 3853-3863 (2006); Turner, A. C. et al. Tailored anomalous group-velocity dispersion in silicon channel waveguides. Opt. Express 14, 4357-4362 (2006)], and an integrated single-shot spectrometer and detectors [Cheben, P. et al. A high-resolution silicon-on-insulator arrayed waveguide grating microspectrometer with submicrometer aperture waveguides. Opt. Express 15, 2299-2306 (2007)] are all areas of current research in silicon photonics. Furthermore, the flexibility of the FWM time-lens and the dispersion engineering available in nanowaveguides allow for straightforward extension of this technique to different wavelength regimes (for example, visible) by using other CMOS-compatible waveguiding materials such as SiN and SiON. Additionally, using our oscilloscope for measuring an arbitrary repetition-rate source requires an ultrafast pump laser with repetition-rate flexibility and can be implemented, for example, using a time-lens compressed source [van Howe, J., Lee, J. H. & Xu, C. Generation of 3.5 nJ femtosecond pulses from a continuous-wave laser without mode locking. Opt. Lett. 32, 1408-1410 (2007)]. Interestingly, the single-shot capability will not only allow for measurements of single optical events but, when synchronized with an optical clock, will also allow for measurements of 'eye-diagrams' by overlaying many single-shot measurements of a communications signal. Beyond communications, an integrated measurement device would facilitate studies in many branches of science where simple, ultrafast measurements of optical waveforms are required.

Methods Summary

To experimentally characterize the silicon-based ultrafast optical oscilloscope, we generate the pump and input waves from an ultrafast fiber laser or an optical parametric oscillator. The pulse train is spectrally separated into a 280-fs pump pulse and a signal pulse. Each input waveform enters the oscilloscope and passes through a dispersive element consisting of a 50-m length of dispersion compensation fiber and is mixed with a pump pulse that has been passed through a 100-m length of dispersion compensation fiber. The test waveforms in FIG. 19*a-c* were created using combinations of nonlinear spectral broadening, dispersion, and interference. The 1.5-cm-long silicon nanowaveguide has a cross-sectional size of 300 nm by 750 nm, a linear propagation loss of 1.5 dB cm-1, and a 3-dB coupling efficiency. For multiple-shot measurements, the FWM optical spectrum is characterized using an optical spectrum analyzer. For the single-shot demonstration, a single-shot spectrometer is implemented using a monochromator and infrared camera and a single event is created per frame.

Methods

Figure 19:
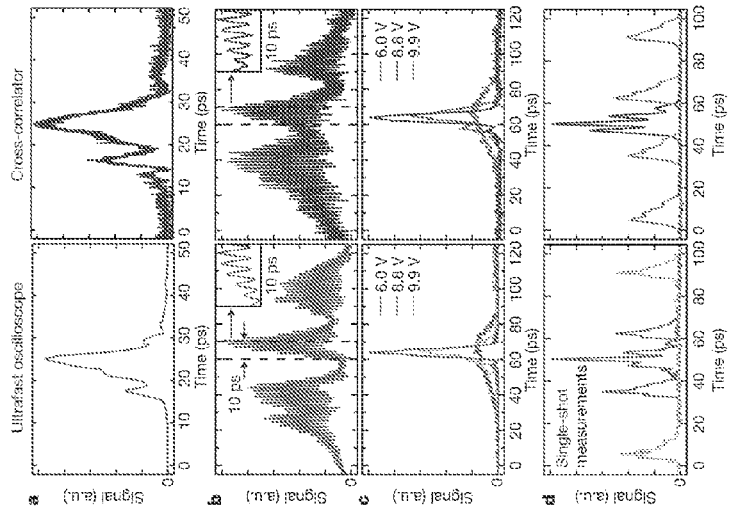
FIGS. 19A-19D are diagrams illustrating output waveforms of an oscilloscope (left side diagrams) as compared to the same waveforms being measured using a cross-correlator (right side diagrams).

Laser sources. The ultrafast fiber laser used produces 80-fs pulses at a 38-MHz repetition rate. The optical parametric oscillator used produces 150-fs pulses at a 76-MHz repetition rate. The pump pulse is a 280-fs pulse with 15 nm of bandwidth centered at 1,550 nm. The test waveforms for FIG. 19 are generated from a variable bandwidth signal pulse centered at 1,580 nm.

Optical fiber. We chose to use dispersion compensation fiber (Corning model: DCM-D-080-04) as it has a dispersion slope that is 12× smaller than that of standard single-mode fiber (Corning model: SMF-28). This smaller third-order dispersion reduces lens aberrations, and experimentally we find a 2× improvement in the temporal resolution as compared to an equivalent system using SMF-28. After passing through the dispersion compensation fiber, the 15-nm-bandwidth pump pulse is amplified using an erbium-doped fiber amplifier, and subsequently FWM is carried out in a CMOS-compatible embedded SOI nanowaveguide.

Test waveforms. The test waveform in FIG. 19*a* is created by amplifying the signal pulse in an erbium-doped fiber amplifier and inducing nonlinear spectral broadening in the amplifier. The spectrally broadened pulse is subsequently passed through a 20-m length of optical fiber. The test waveform in FIG. 19*b* is generated by dispersing and interfering two 300-fs pulses using 50-m of optical fiber and a Michelson interferometer. The test waveforms in FIG. 19*c* are generated by synchronizing a time-lens compressed laser source [van Howe, J., Lee, J. H. & Xu, C. Generation of 3.5 nJ femtosecond pulses from a continuous-wave laser without mode locking. Opt. Lett. 32, 1408-1410 (2007)] with a repetition rate of 9.6 GHz with an ultrafast fiber laser pump source operating at 36 MHz. The pulse width of the 9.6-GHz source is determined by the magnitude of the electrical sine wave sent into a phase modulator used for the time-lens compressor. The test waveforms in FIG. 19d are generated by chirping a 300-fs pulse using 50-m of SMF-28 and splitting it into two pulses using a Michelson interferometer. The separation between the pulses can then be adjusted using a delay stage on the interferometer.

Silicon waveguide. The dimensions of the silicon waveguide were chosen to maximize the conversion bandwidth by positioning a zero-group-velocity dispersion point in the C telecommunications band. The peak optical power inside the nanowaveguides is maintained below 100 mW to avoid self-phase modulation and two-photon induced free-carrier effects in the silicon [Foster, M. A., Turner, A. C., Salem, R., Lipson, M. & Gaeta, A. L. Broad-band continuous-wave parametric wavelength conversion in silicon nano-waveguides. Opt. Express 15, 12949-12958 (2007)].

Single-shot measurements. A single event is created per frame of the single-shot spectrometer. The 38-MHz source is down-sampled using an electro-optical modulator such that only one pulse is generated every 0.5 ms, which corresponds to the integration time of the camera and therefore a single-shot per camera image.

A description of information presented in FIGS. 17a-19d is presented herein below.

Figure 17:
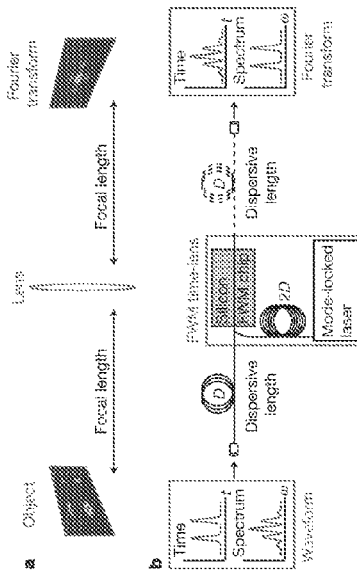
FIG. 17A is a diagram illustrating utilization of a Fourier transform property of a lens.
FIG. 17B is a diagram of an oscilloscope.

FIG. 17—The silicon-based ultrafast optical oscilloscope. An ultrafast optical oscilloscope is implemented using a four-wave mixing based parametric time-lens on a silicon chip. a, A spatial optical Fourier transform processor. The spatial lens can generate the Fourier transform of an input waveform using the two-focal-length configuration shown. b, A temporal optical Fourier transform processor. The time-lens can convert the temporal profile of the input to the spectral profile of the output. For the FWM timelens, the focal length (D) is half the dispersive-length of optical fiber through which the pump pulse passes (2D). Single-shot temporal measurements can then be carried out by simply measuring the spectrum at the output of the processor.

FIG. 18—Characterization of the record length and resolution of the ultrafast oscilloscope. A 342-fs pulse is temporally scanned and measured using the silicon-chip-based ultrafast optical oscilloscope demonstrating a record length of 100 ps. The average width of the 342-fs pulse across this scan range, as observed by the oscilloscope, is 407 fs, indicating a deconvolved resolution of 220 fs. a.u., arbitrary units. Each color represents a separate measurement as the pulse is scanned.

FIG. 19—Comparison of measurements using the ultrafast oscilloscope and a cross-correlator. a, 30-ps pulse generated through nonlinear spectral broadening in an erbium-doped fiber amplifier and subsequently propagated through 20 m of single-mode optical fiber. b, Highly complex waveform generated by dispersing and interfering two 300-fs pulses. Inset, magnified view of the 10-ps temporal region from 60 ps to 70 ps. c, Measurement of a separate ultrashort-pulse laser source operating at various pulse durations. The silicon-chip-based ultrafast optical oscilloscope is used to minimize the pulse width emitted from this source in real time by varying the voltage to an electro-optic modulator within the laser source. d, Single-shot measurements of two chirped pulses with various temporal separations compared to a multiple-shot cross-correlation. When the pulses temporally overlap, interference fringes are observed in the time domain.

[End of Description of A. Silicon-Chip-Based Ultrafast Optical Oscilloscope]

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements.

[End of excerpted section of U.S. Provisional Patent Application No. 61/105,217 filed Oct. 14, 2008, entitled Semiconductor-Based Ultrafast Optical Oscilloscope]

A small sample of systems methods and apparatus that are described herein is as follows:

A1. An apparatus comprising:
a first dispersive element through which an input waveform propagates;
an optical element for outputting an output waveform; and
a pump pulse input unit for input of a pump pulse into the optical element, the pump pulse input unit being coupled to the optical element, the pump pulse input unit having a second dispersive element through which the pump pulse propagates;
wherein the optical element and the pump pulse input unit define a temporal lens, wherein each of the first dispersive element and the pump pulse input unit are coupled to the optical element;
wherein the first dispersive element and the second dispersive element are configured so that a dispersion of the first dispersive element is matched with a dispersion of the second dispersive element;
wherein the apparatus is configured so that the input waveform and the pump pulse are combined by four wave mixing at the optical element, so that the output waveform is phase shifted relative to the input waveform.

A2. The apparatus of claim A1, wherein for coordinating a dispersion of the first dispersive element with the second dispersive element the second dispersive element and the first dispersive element have a 2:1 dispersion ratio.

A3. The apparatus of claim A1, wherein the optical element in which the input waveform and the pump pulse are combined by four wave mixing comprises a waveguide provided on a photonic chip.

A4. The apparatus of claim A1, wherein the first dispersive element and the pump pulse input unit are arranged so that the input waveform travels through one focal length of dispersion prior to reaching the optical element.

A5. The apparatus of claim A1, wherein the pump pulse input unit is provided by a pump pulse source and the second dispersive element.

A6. The apparatus of claim A1, wherein the apparatus further comprises a detector unit for detecting the output waveform.

A7. The apparatus of claim A1, wherein the apparatus further comprises a detector unit for detecting the output waveform, the detector unit having a spectrometer and a photodetector.

A8. The apparatus of claim A1, wherein the optical element is provided by a photonic waveguide and wherein the first dispersive element, the second dispersive element, and the photonic waveguide are incorporated into a photonic chip-scale device.

A9. The apparatus of claim A8, wherein the photonic waveguide is a semiconductor waveguide.

A10. The apparatus of claim A1, wherein the optical element is configured to include a dispersion that yields a conversion bandwidth of greater than 100 nm.

A11. The apparatus of claim A1, wherein the optical element is configured to include a dispersion that yields a conversion bandwidth of greater than 150 nm.

A12. The apparatus of claim A1, wherein the optical element is adapted to include a zero-group-velocity dispersion point in the C telecommunications band.

A13. The apparatus of claim A1, wherein the optical element is configured so that a signal peak power dynamic range of the optical element is $10^3$.

A14. The apparatus of claim A1, wherein the optical element is configured so that a signal peak power dynamic range of the optical element is within a range of 100 μW to 100 mW.

A15. The apparatus of claim A1, wherein the optical element is configured so that each of the input waveform the pump pulse and the output waveform are within the S, C, and L telecommunication bands.

A16. The apparatus of claim A1, wherein the apparatus is configured so that the peak optical power inside the waveguide is maintained at level sufficiently low for avoidance of self phase modulation.

A17. The apparatus of claim A1, wherein the apparatus is configured so that the peak optical power inside the waveguide is maintained sufficiently low for avoidance of two photon induced free carrier effects.

A18. The apparatus of claim A1, wherein the apparatus is configured so that the peak optical power inside the waveguide is maintained below a 100 mW.

B1. An apparatus for generating a representation of an input waveform, the apparatus comprising:
a first dispersive element through which the input waveform propagates, an optical element for outputting an output waveform;
a pump pulse input unit for input of a pump pulse into the optical element, the pump pulse input unit being coupled to the optical element, the pump pulse input unit having a second dispersive element through which the pump pulse propagates; and
a detector unit for detecting the output waveform;
wherein the optical element and the pump pulse input unit define a temporal lens, wherein each of the first dispersive element and the pump pulse input unit are coupled to the optical element;
wherein the first dispersive element and the second dispersive element are configured so that a dispersion of the first dispersive element is matched with a dispersion of the second dispersive element;
wherein the apparatus is configured so that the input waveform and the pump pulse are combined by four wave mixing at the optical element so that the output waveform is phase shifted relative to the input waveform.

B2. The apparatus of claim B1, wherein the detector unit includes each of a spectrometer and a photodetector.

B3. The apparatus of claim B1, wherein the apparatus includes a spectrometer substantially directly coupled to the optical element.

B4. The apparatus of claim, wherein the apparatus includes an output dispersive element having an output dispersion and wherein the first dispersive element has an input dispersion and wherein the apparatus is configured so that the condition $$\frac{Res_M}{M} \leq \frac{\tau_{pump}}{\sqrt{2}}$$

applies, where $Res_M$ is the resolution limit of the detector unit, $\tau_{pump}$ is the pump pulsewidth and M is the magnification factor determined by the ratio of the output dispersion to the input dispersion.

B5. The apparatus of claim, wherein the apparatus includes an output dispersive element having an output dispersion and wherein the first dispersive element has an input dispersion and wherein the apparatus is configured so that the condition $$\frac{Res_M}{M} \approx \frac{\tau_{pump}}{\sqrt{2}}$$

applies, where $Res_M$ is the resolution limit of the detector unit, $\tau_{pump}$ is the pump pulsewidth and M is the magnification factor determined by the ratio of the output dispersion to the input dispersion.

C1. An apparatus for generating a representation of an input waveform, the apparatus comprising:
a first dispersive element through which the input waveform propagates,
a waveguide provided on a photonic chip, the waveguide having a zero-group-velocity dispersion point in the C telecommunications band and a dispersion yielding a conversion bandwidth of greater than 100 nm, wherein the waveguide is configured to output an output waveform;
a pump pulse input unit for input of a pump pulse into the optical element, the pump pulse input unit being coupled to the optical element, the pump pulse input unit having a second dispersive element through which the pump pulse propagates, wherein the apparatus is configured so that each of the input waveform the pump pulse and the output waveform are within the S, C, and L telecommunication bands; and
a detector unit for detecting the output waveform, the detector unit comprising one or more of a spectrometer and a photodetector;
wherein the waveguide and the pump pulse input unit define a temporal lens, wherein each of the first dispersive element and the pump pulse input unit are coupled to the waveguide;
wherein the first dispersive element and the second dispersive element are configured so that a dispersion of the first dispersive element is matched with a dispersion of the second dispersive element;
wherein the apparatus is configured so that the input waveform and the pump pulse are combined by four wave mixing at the waveguide so that the output waveform is phase shifted relative to the input waveform;
wherein the apparatus is configured to that the peak optical power inside the waveguide is maintained below 100 mW.

D1. An apparatus for generating a representation of an input waveform, the apparatus comprising:
a waveguide provided on a photonic chip, the waveguide being adapted for coupling of the input waveform;
a pump pulse input unit for input of a pump pulse into the waveguide, the pump pulse input unit being coupled to the waveguide, wherein the pump pulse input unit in combination with the waveguide defines a temporal lens;
wherein the apparatus is configured so that the input waveform and the pump pulse combine by way of four wave mixing in the waveguide,
wherein an output waveform is output from the waveguide;
wherein the apparatus further includes a detector unit for detecting the output waveform.

D2. The apparatus of claim D1, wherein the waveguide is configured to include a dispersion that yields a conversion bandwidth of greater than 100 nm.

D3. The apparatus of claim D1, wherein the waveguide is configured to include a dispersion that yields a conversion bandwidth of greater than 150 nm.

D4. The apparatus of claim D1, wherein the waveguide is adapted to include a zero-group-velocity dispersion point in the C telecommunications band.

D5. The apparatus of claim D1, wherein the waveguide is configured so that a signal peak power dynamic range of the waveguide is $10^3$.

D6. The apparatus of claim D1, wherein the waveguide is configured so that a signal peak power dynamic range of the waveguide is within a range of 100 µW to 100 mW.

D7. The apparatus of claim D1, wherein the apparatus is configured so that each of the input waveform the pump pulse and the output waveform are within the S, C, and L telecommunication bands.

D8. The apparatus of claim D1, wherein the apparatus is configured to that the peak optical power inside the waveguide is maintained at level sufficiently low for avoidance of self phase modulation.

D9. The apparatus of claim D1, wherein the apparatus is configured to that the peak optical power inside the waveguide is maintained sufficiently low for avoidance of two photon induced free carrier effects.

D10. The apparatus of claim D1, wherein the apparatus is configured to that the peak optical power inside the waveguide is maintained below 100 mW.

D11. The apparatus of claim D1, wherein the waveguide provided on a photonic chip comprises semiconductor material.

E1. An apparatus for generating a representation of an input waveform, the apparatus comprising:
  a first dispersive element through which the input waveform propagates;
  a waveguide provided on a photonic chip, the waveguide for output of an output waveform, the waveguide being adapted for coupling of the input waveform;
  a detector unit for detecting the output waveform; and
  a pump pulse input unit for input of a pump pulse into the waveguide, the pump pulse input unit being coupled to the waveguide wherein the pump pulse input unit includes a second dispersive element, wherein the pump pulse input unit in combination with the waveguide defines a temporal lens;
  wherein the first dispersive element and the second dispersive element are configured so that a dispersion of the first dispersive element is matched to a dispersion of the second dispersive element;
  wherein the apparatus is configured so that the pump pulse combines with the input waveform by way of four wave mixing in the waveguide so that the output waveform is phase shifted relative to the input waveform.

E2. The apparatus of claim E1, wherein the first dispersive element and the second dispersive element are provided on the photonic chip.

E3. The apparatus of claim E1, wherein the first dispersive element, the second dispersive element and the detector unit are provided on the photonic chip.

F1. A method for generating a high resolution time domain representation of an input waveform comprising:
  dispersing the input waveform to generate a dispersed input waveform;
  subjecting the dispersed input waveform to four wave mixing by combining the dispersed input waveform with a dispersed pump pulse to generate a converted waveform; and
  presenting the converted waveform to a spectrum analyzer for recording of the converted waveform.

F2. The method of claim F1, wherein the dispersing the input waveform includes matching a dispersion through which the input waveform is dispersed with a dispersion through which the pump pulse is dispersed.

F3. The method of claim F2, wherein the matching includes providing a dispersion for dispersing the pump pulse that is twice as dispersive as the dispersion through which the input waveform is dispersed.

F4. The method of claim F1, wherein the subjecting the input waveform to four wave mixing includes utilizing a waveguide provided on a photonic chip, the waveguide that is adapted to include a zero-group-velocity dispersion point in the C telecommunications band.

F5. The method of claim F1, wherein the subjecting the input waveform to four wave mixing includes utilizing a waveguide provided on a photonic chip, wherein the waveguide is configured so that the peak optical power inside the waveguide is maintained below 100 mW.

F6. The method of claim F1, wherein the method includes providing the input waveform the pump pulse and the output waveform to be within the S, C, and L telecommunication bands.

G1. An apparatus for generating a representation of an input waveform, the apparatus comprising:
  an optical element, wherein the apparatus is configured so that the input waveform is coupled to the optical element;
  wherein the apparatus is configured so that the input waveform is subjected to a quadratic phase shift within the optical element for outputting an output waveform that is phase shifted relative to the input waveform; and
  a detector unit operative to detect the output waveform;
  wherein the apparatus is configured so that the detector unit is operative to output a first record having a first output record length, and is further operative to output a second record having a second output record length.

G2. The apparatus of claim G1, wherein the apparatus includes first and second output dispersive elements having first and second dispersions, the first dispersion being different than the second dispersion, wherein the apparatus is operative for coupling the output waveform to each of the first and second output dispersive elements, the detector unit having a first photodetector coupled to the first output dispersion element for output of the first data record, the detector unit having a second photodetector coupled to the second output dispersion element for output of the second record.

G3. The apparatus of claim G2, wherein the detector unit includes a spectrometer for output of the first record and a photodetector for output of the second record.

G4. The apparatus of claim G1, wherein the apparatus includes a first output dispersive element and a second output dispersive element, and wherein the apparatus further includes a switch for selectively coupling the output waveform to one of the first output dispersive element and second output dispersive element.

G5. The apparatus of claim G1, wherein the apparatus is configured so that the quadratic phase shift is provided utilizing four wave mixing.

H1. A system for processing an input waveform, the system comprising:
  an oscilloscope having an optical element for coupling of the input waveform, wherein the oscilloscope is configured so that the input waveform is subjected to a quadratic phase shift within the optical element for outputting an output waveform that is phase shifted relative to the input waveform, the oscilloscope having a detector unit for output of first and second records representative of the input waveform; and
  a processing unit for processing each of the first and second records, wherein the processing unit is operative for determining a processing unit output responsively to the processing.

H2. The system of claim H1, wherein the processing unit output controls an apparatus for transmission of encoded optical data.

H3. The system of claim H1, wherein the system is operative so that the first and second records for processing are varied on an open loop basis.

H4. The system of claim H1, wherein the system is operative so that the second record output by the detector unit is output responsively to a processing by the processing unit of the first record.

H5. The system of claim H1, wherein the system is operative so that the first record is output with use of a spectrometer detecting the output waveform, and wherein the system is further operative so that the second record is output with use of a photodetector.

H6. The system of claim H1, wherein the system is operative so that the first record is output with use of a photodetector that detects the output waveform dispersed through a first output dispersion, and wherein the system is further operative so that the second record is output with use of a photodetector that detects the output waveform dispersed through a second dispersion.

I1. A system for use with an apparatus for transmission of encoded optical data, wherein transmitted data includes binary data encoded utilizing a succession of optical pulses, the optical pulses having nominal characteristics, the system comprising:

an oscilloscope coupled to an output of the apparatus for output of at least one record representing the succession of optical pulses output by the apparatus, the oscilloscope being operative to impart a phase shift to an input waveform, wherein the oscilloscope is operative so that the record has a resolution of equal to or better than 220 fs and a record length of equal to or greater than 100 ps;

a processing unit for processing the record, the processing unit being operative for processing one or more pulse representations of the record to determine whether one or more optical pulses satisfy a criteria indicative of the one or more pulses having acceptable quality;

wherein the processing unit is operative to generate an output responsively to the processing.

I2. The system of claim I1, wherein the output controls an indicator.

I3. The system of claim I1, wherein the output controls the apparatus.

I4. The system of claim I1, wherein the oscilloscope is operative to output a first record having a first output record length and a second record having a second output record length wherein the processing unit is operative to transmit one or more communications to the oscilloscope responsively to which the oscilloscope returns to the processing unit for processing by the processing unit a first record in a first format of longer output record length and a second record in a second format of a shorter output record length, wherein the processing unit is operative for processing of the first record and the second record.

I5. The system of claim I1, wherein the system is operative so that responsively to the output that is output by the processing unit, the apparatus adjusts one or more of a light polarization parameter, a bias voltage parameter, a bias voltage parameter, and an RF power parameter.

J1. A photonic chip comprising:
a substrate; and
a device structure having the elements of (a) a first dispersive element having a dispersion for dispersing an input waveform, (b) a second dispersive element adapted for dispersing a pump pulse having a dispersion matched to a dispersion of the first dispersive element; (c) a waveguide for outputting an output waveform, the waveguide adapted for combining of the input waveform and the pump pulse by way of four wave mixing, so that the output waveform output by the waveguide is phase shifted relative to the input waveform;

wherein each of the first dispersive element, the second dispersive element, and the waveguide are formed by etching a mass of waveguiding material disposed above the substrate.

J2. The photonic chip of claim J1, wherein the device structure further comprises portion of a detector for use in detecting the output waveform, the portion of the detector formed by etching of the mass of waveguiding material.

J3. The photonic chip of claim J1, wherein the device structure further comprises a detector for detecting the output waveform, wherein a first portion of the detector is formed by etching of the mass of waveguiding material, wherein a second portion of the detector is formed by etching a mass of photosensitive semiconductor material, the mass of photosensitive semiconductor material being disposed proximate the mass of waveguiding material.

J4. The photonic chip of claim J1, wherein the device structure further comprises a spectrometer having a grating and a photodetector array, the spectrometer for detecting the output waveform, wherein the grating is formed by etching of the mass of waveguiding material, wherein the photodetector array is formed by etching a mass of photosensitive semiconductor material, the mass of photosensitive semiconductor material being disposed proximate the mass of waveguiding material.

J5. The photonic chip of claim J1, wherein the device structure further comprises an output dispersive element for dispersing the output waveform, the output dispersive element being formed by etching of the mass of waveguiding material.

J6. The photonic chip of claim H1, wherein the device structure has defined therein an electrical signal output for outputting an electrical signal record representing the input waveform, and an optical output for output of the output waveform.

J7. The photonic chip of claim H1, wherein the device structure has defined therein a first optical input for input of an input waveform, a second optical input for input of a pump pulse, and at least one output selected from the group consisting of an optical output and an electrical signal output.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements.

We claim:
1. An apparatus comprising:
a first dispersive element through which an input waveform propagates;
an optical element for outputting an output waveform; and
a pump pulse input unit for input of a pump pulse into the optical element, the pump pulse input unit being coupled to the optical element, the pump pulse input unit having a second dispersive element through which the pump pulse propagates;
wherein the optical element and the pump pulse input unit define a temporal lens, wherein each of the first dispersive element and the pump pulse input unit are coupled to the optical element;

wherein the first dispersive element and the second dispersive element are configured so that a dispersion of the first dispersive element is matched with a dispersion of the second dispersive element;

wherein the apparatus is configured so that the input waveform and the pump pulse are combined by four wave mixing at the optical element, so that the output waveform is phase shifted relative to the input waveform.

2. The apparatus of claim 1, wherein for coordinating a dispersion of the first dispersive element with the second dispersive element the second dispersive element and the first dispersive element have a 2:1 dispersion ratio.

3. The apparatus of claim 1, wherein the optical element in which the input waveform and the pump pulse are combined by four wave mixing comprises a waveguide provided on a photonic chip.

4. The apparatus of claim 1, wherein the first dispersive element and the pump pulse input unit are arranged so that the input waveform travels through one focal length of dispersion prior to reaching the optical element.

5. The apparatus of claim 1, wherein the pump pulse input unit is provided by a pump pulse source and the second dispersive element.

6. The apparatus of claim 1, wherein the apparatus further comprises a detector unit for detecting the output waveform.

7. The apparatus of claim 1, wherein the apparatus further comprises a detector unit for detecting the output waveform, the detector unit having a spectrometer and a photodetector.

8. The apparatus of claim 1, wherein the optical element is provided by a photonic waveguide and wherein the first dispersive element, the second dispersive element, and the photonic waveguide are incorporated into a photonic chip-scale device.

9. The apparatus of claim 8, wherein the photonic waveguide is a semiconductor waveguide.

10. The apparatus of claim 1, wherein the optical element is configured to include a dispersion that yields a conversion bandwidth of greater than 100 nm.

11. The apparatus of claim 1, wherein the optical element is configured to include a dispersion that yields a conversion bandwidth of greater than 150 nm.

12. The apparatus of claim 1, wherein the optical element is adapted to include a zero-group-velocity dispersion point in the C telecommunications band.

13. The apparatus of claim 1, wherein the optical element is configured so that a signal peak power dynamic range of the optical element is $10^3$.

14. The apparatus of claim 1, wherein the optical element is configured so that a signal peak power dynamic range of the optical element is within a range of 100 µW to 100 mW.

15. The apparatus of claim 1, wherein the optical element is configured so that each of the input waveform the pump pulse and the output waveform are within the S, C, and L telecommunication bands.

16. The apparatus of claim 1, wherein the apparatus is configured so that the peak optical power inside a waveguide included in the optical element is maintained at level sufficiently low for avoidance of self phase modulation.

17. The apparatus of claim 1, wherein the apparatus is configured so that the peak optical power inside a waveguide included in the optical element is maintained sufficiently low for avoidance of two photon induced free carrier effects.

18. The apparatus of claim 1, wherein the apparatus is configured so that the peak optical power inside a waveguide included in the optical element is maintained below 100 mW.

19. An apparatus for generating a representation of an input waveform, the apparatus comprising:

a first dispersive element through which the input waveform propagates, an optical element for outputting an output waveform;

a pump pulse input unit for input of a pump pulse into the optical element, the pump pulse input unit being coupled to the optical element, the pump pulse input unit having a second dispersive element through which the pump pulse propagates; and a detector unit for detecting the output waveform; wherein the optical element and the pump pulse input unit define a temporal lens, wherein each of the first dispersive element and the pump pulse input unit are coupled to the optical element;

wherein the first dispersive element and the second dispersive element are configured so that a dispersion of the first dispersive element is matched with a dispersion of the second dispersive element; wherein the apparatus is configured so that the input waveform and the pump pulse are combined by four wave mixing at the optical element so that the output waveform is phase shifted relative to the input waveform.

20. The apparatus of claim 19, wherein the detector unit includes each of a spectrometer and a photodetector.

21. The apparatus of claim 19, wherein the apparatus includes a spectrometer substantially directly coupled to the optical element.

22. The apparatus of claim 19, wherein the apparatus includes an output dispersive element having an output dispersion and wherein the first dispersive element has an input dispersion and wherein the apparatus is configured so that the condition $$\frac{Res_M}{M} \leq \frac{\tau_{pump}}{\sqrt{2}}$$

applies, where $Res_M$ is the resolution limit of the detector unit, $\tau_{pump}$ is the pump pulsewidth and M is the magnification factor determined by the ratio of the output dispersion to the input dispersion.

23. The apparatus of claim 19, wherein the apparatus includes an output dispersive element having an output dispersion and wherein the first dispersive element has an input dispersion and wherein the apparatus is configured so that the condition $$\frac{Res_M}{M} \approx \frac{\tau_{pump}}{\sqrt{2}}$$

applies, where $ReS_M$ is the resolution limit of the detector unit, $\tau_{pump}$ is the pump pulsewidth and M is the magnification factor determined by the ratio of the output dispersion to the input dispersion.

24. An apparatus for generating a representation of an input waveform, the apparatus comprising:

a first dispersive element through which the input waveform propagates, an optical element having a waveguide provided on a photonic chip, the waveguide having a zero-group-velocity dispersion point in the C telecommunications band and a dispersion yielding a conversion bandwidth of greater than 100 nm, wherein the waveguide is configured to output an output waveform;

a pump pulse input unit for input of a pump pulse into the optical element, the pump pulse input unit being coupled to the optical element, the pump pulse input unit having a second dispersive element through which the pump pulse propagates, wherein the apparatus is configured so that each of the input waveform the pump pulse and the output waveform are within the S, C, and L telecommunication bands;

and a detector unit for detecting the output waveform, the detector unit comprising one or more of a spectrometer and a photodetector;

wherein the waveguide and the pump pulse input unit define a temporal lens, wherein each of the first dispersive element and the pump pulse input unit are coupled to the waveguide;

wherein the first dispersive element and the second dispersive element are configured so that a dispersion of the first dispersive element is matched with a dispersion of the second dispersive element;

wherein the apparatus is configured so that the input waveform and the pump pulse are combined by four wave mixing at the waveguide so that the output waveform is phase shifted relative to the input waveform;

wherein the apparatus is configured to that the peak optical power inside the waveguide is maintained below 100 mW.

25. An apparatus for generating a representation of an input waveform, the apparatus comprising:

a waveguide provided on a photonic chip, the waveguide being adapted for coupling of the input waveform;

a pump pulse input unit for input of a pump pulse into the waveguide, the pump pulse input unit being coupled to the waveguide, wherein the pump pulse input unit in combination with the waveguide defines a temporal lens;

wherein the apparatus is configured so that the input waveform and the pump pulse combine by way of four wave mixing in the waveguide, wherein an output waveform is output from the waveguide;

wherein the apparatus further includes a detector unit for detecting the output waveform.

26. The apparatus of claim 25, wherein the waveguide is configured to include a dispersion that yields a conversion bandwidth of greater than 100 nm.

27. The apparatus of claim 25, wherein the waveguide is configured to include a dispersion that yields a conversion bandwidth of greater than 150 nm.

28. The apparatus of claim 25, wherein the waveguide is adapted to include a zero-group-velocity dispersion point in the C telecommunications band.

29. The apparatus of claim 25, wherein the waveguide is configured so that a signal peak power dynamic range of the waveguide is $10^3$.

30. The apparatus of claim 25, wherein the waveguide is configured so that a signal peak power dynamic range of the waveguide is within a range of 100 µW to 100 mW.

31. The apparatus of claim 25, wherein the apparatus is configured so that each of the input waveform the pump pulse and the output waveform are within the S, C, and L telecommunication bands.

32. The apparatus of claim 25, wherein the apparatus is configured to that the peak optical power inside the waveguide is maintained at level sufficiently low for avoidance of self phase modulation.

33. The apparatus of claim 25, wherein the apparatus is configured to that the peak optical power inside the waveguide is maintained sufficiently low for avoidance of two photon induced free carrier effects.

34. The apparatus of claim 25, wherein the apparatus is configured to that the peak optical power inside the waveguide is maintained below 100 mW.

35. The apparatus of claim 25, wherein the waveguide provided on a photonic chip comprises semiconductor material.

36. An apparatus for generating a representation of an input waveform, the apparatus comprising:

a first dispersive element through which the input waveform propagates;

a waveguide provided on a photonic chip, the waveguide for output of an output waveform, the waveguide being adapted for coupling of the input waveform;

a detector unit for detecting the output waveform; and a pump pulse input unit for input of a pump pulse into the waveguide, the pump pulse input unit being coupled to the waveguide wherein the pump pulse input unit includes a second dispersive element, wherein the pump pulse input unit in combination with the waveguide defines a temporal lens;

wherein the first dispersive element and the second dispersive element are configured so that a dispersion of the first dispersive element is matched to a dispersion of the second dispersive element;

wherein the apparatus is configured so that the pump pulse combines with the input waveform by way of four wave mixing in the waveguide so that the output waveform is phase shifted relative to the input waveform.

37. The apparatus of claim 36, wherein the first dispersive element and the second dispersive element are provided on the photonic chip.

38. The apparatus of claim 36, wherein the first dispersive element, the second dispersive element and the detector unit are provided on the photonic chip.

39. A method for generating a high resolution time domain representation of an input waveform comprising:

dispersing the input waveform to generate a dispersed input waveform;

subjecting the dispersed input waveform to four wave mixing by combining the dispersed input waveform with a dispersed pump pulse to generate a converted waveform; and presenting the converted waveform to a spectrum analyzer for recording of the converted waveform.

40. The method of claim 39, wherein the dispersing the input waveform includes matching a dispersion through which the input waveform is dispersed with a dispersion through which the pump pulse is dispersed.

41. The method of claim 40, wherein the matching includes providing a dispersion for dispersing the pump pulse that is twice as dispersive as the dispersion through which the input waveform is dispersed.

42. The method of claim 39, wherein the subjecting the input waveform to four wave mixing includes utilizing a waveguide provided on a photonic chip, the waveguide that is adapted to include a zero-group-velocity dispersion point in the C telecommunications band.

43. The method of claim 39, wherein the subjecting the input waveform to four wave mixing includes utilizing a waveguide provided on a photonic chip, wherein the waveguide is configured so that the peak optical power inside the waveguide is maintained below 100 mW.

44. The method of claim 39, wherein the method includes providing the input waveform the pump pulse and the output waveform to be within the S, C, and L telecommunication bands.

45. An apparatus for generating a representation of an input waveform, the apparatus comprising:
an optical element, wherein the apparatus is configured so that the input waveform is coupled to the optical element;
wherein the apparatus is configured so that the input waveform is subjected to a quadratic phase shift within the optical element for outputting an output waveform that is phase shifted relative to the input waveform; and
a detector unit operative to detect the output waveform;
wherein the apparatus is configured so that the detector unit is operative to output a first record having a first output record length, and is further operative to output a second record having a second output record length.

46. The apparatus of claim 45, wherein the apparatus includes first and second output dispersive elements having first and second dispersions, the first dispersion being different than the second dispersion, wherein the apparatus is operative for coupling the output waveform to each of the first and second output dispersive elements, the detector unit having a first photodetector coupled to the first output dispersion element for output of the first record, the detector unit having a second photodetector coupled to the second output dispersion element for output of the second record.

47. The apparatus of claim 46, wherein the detector unit includes a spectrometer for output of the first record and a photodetector for output of the second record.

48. The apparatus of claim 45, wherein the apparatus includes a first output dispersive element and a second output dispersive element, and wherein the apparatus further includes a switch for selectively coupling the output waveform to one of the first output dispersive element and second output dispersive element.

49. The apparatus of claim 45, wherein the apparatus is configured so that the quadratic phase shift is provided utilizing four wave mixing.

50. A system for processing an input waveform, the system comprising:
an oscilloscope having an optical element for coupling of the input waveform, wherein the oscilloscope is configured so that the input waveform is subjected to a quadratic phase shift within the optical element for outputting an output waveform that is phase shifted relative to the input waveform, the oscilloscope having a detector unit for output of first and second records representative of the input waveform; and
a processing unit for processing each of the first and second records, wherein the processing unit is operative for determining a processing unit output responsively to the processing.

51. The system of claim 50, wherein the processing unit output controls an apparatus for transmission of encoded optical data.

52. The system of claim 50, wherein the system is operative so that the first and second records for processing are varied on an open loop basis.

53. The system of claim 50, wherein the system is operative so that the second record output by the detector unit is output responsively to a processing by the processing unit of the first record.

54. The system of claim 50, wherein the system is operative so that the first record is output with use of a spectrometer detecting the output waveform, and wherein the system is further operative so that the second record is output with use of a photodetector.

55. The system of claim 50, wherein the system is operative so that the first record is output with use of a photodetector that detects the output waveform dispersed through a first output dispersion, and wherein the system is further operative so that the second record is output with use of a photodetector that detects the output waveform dispersed through a second dispersion.

56. A system for use with an apparatus for transmission of encoded optical data, wherein transmitted data includes binary data encoded utilizing a succession of optical pulses, the optical pulses having nominal characteristics, the system comprising:
an oscilloscope coupled to an output of the apparatus for output of at least one record representing the succession of optical pulses output by the apparatus, the oscilloscope being operative to impart a phase shift to an input waveform, wherein the oscilloscope is operative so that the record has a resolution of equal to or better than 220 fs and a record length of equal to or greater than 100 ps;
a processing unit for processing the record, the processing unit being operative for processing one or more pulse representations of the record to determine whether one or more optical pulses satisfy a criteria indicative of the one or more pulses having acceptable quality;
wherein the processing unit is operative to generate an output responsively to the processing.

57. The system of claim 56, wherein the output controls an indicator.

58. The system of claim 56, wherein the output controls the apparatus.

59. The system of claim 56, wherein the oscilloscope is operative to output a first record having a first output record length and a second record having a second output record length wherein the processing unit is operative to transmit one or more communications to the oscilloscope responsively to which the oscilloscope returns to the processing unit for processing by the processing unit a first record in a first format of longer output record length and a second record in a second format of a shorter output record length, wherein the processing unit is operative for processing of the first record and the second record.

60. The system of claim 56, wherein the system is operative so that responsively to the output that is output by the processing unit, the apparatus adjusts one or more of a light polarization parameter, a bias voltage parameter, a bias voltage parameter, and an RF power parameter.

61. A photonic chip comprising:
a substrate; and
a device structure having the elements of (a) a first dispersive element having a dispersion for dispersing an input waveform, (b) a second dispersive element adapted for dispersing a pump pulse having a dispersion matched to a dispersion of the first dispersive element; (c) a waveguide for outputting an output waveform, the waveguide adapted for combining of the input waveform and the pump pulse by way of four wave mixing, so that the output waveform output by the waveguide is phase shifted relative to the input waveform;
wherein each of the first dispersive element, the second dispersive element, and the waveguide are formed by etching a mass of waveguiding material disposed above the substrate.

62. The photonic chip of claim 61, wherein the device structure further comprises portion of a detector for use in detecting the output waveform, the portion of the detector formed by etching of the mass of waveguiding material.

63. The photonic chip of claim 61, wherein the device structure further comprises a detector for detecting the output waveform, wherein a first portion of the detector is formed by etching of the mass of waveguiding material, wherein a second portion of the detector is formed by etching a mass of photosensitive semiconductor material, the mass of photosensitive semiconductor material being disposed proximate the mass of waveguiding material.

64. The photonic chip of claim 61, wherein the device structure further comprises a spectrometer having a grating and a photodetector array, the spectrometer for detecting the output waveform, wherein the grating is formed by etching of the mass of waveguiding material, wherein the photodetector array is formed by etching a mass of photosensitive semiconductor material, the mass of photosensitive semiconductor material being disposed proximate the mass of waveguiding material.

65. The photonic chip of claim 61, wherein the device structure further comprises an output dispersive element for dispersing the output waveform, the output dispersive element being formed by etching of the mass of waveguiding material.

66. The photonic chip of claim 61, wherein the device structure has defined therein an electrical signal output for outputting an electrical signal record representing the input waveform, and an optical output for output of the output waveform.

67. The photonic chip of claim 61, wherein the device structure has defined therein a first optical input for input of an input waveform, a second optical input for input of a pump pulse, and at least one output selected from the group consisting of an optical output and an electrical signal output.

68. An apparatus for characterizing an input waveform, the apparatus comprising:
an input dispersive element through which an input waveform passes;
a pump pulse dispersive element through which a pump pulse passes;
an optical element in which a dispersed input waveform after being dispersed by the input dispersive element and the pump pulse after being dispersed by the pump pulse dispersive element are combined by four wave mixing for output of an output waveform that is wavelength shifted relative to the input waveform;
wherein a dispersion of the input dispersive element and a dispersion of the pump pulse dispersive element are matched in a manner so that a spectrum of the output waveform represents a temporal profile of the input waveform.

69. The apparatus of claim 68, wherein the apparatus further comprises an output dispersive element through which the output waveform passes, the apparatus being adapted to lengthen the input waveform in time.

70. The apparatus of claim 69, wherein the apparatus further comprises a photodetector for measuring the output waveform.

71. The apparatus of claim 68, wherein the apparatus further comprises a spectrometer for measuring a spectrum of the output waveform, the spectrum representing the temporal profile of the input waveform.

72. The apparatus of claim 69, wherein the apparatus further comprises a photodetector for measuring the output waveform and a spectrometer for measuring a spectrum of the output waveform.

73. The apparatus of claim 68, wherein each of the input waveform, the pump pulse and the output waveform have wavelengths within the S, C, and L telecommunications bands.

74. The apparatus of claim 68, wherein the optical element comprises a Silicon-on-Insulator (SOI) photonic platform.

75. The apparatus of claim 68, wherein the optical element comprises a semiconductor photonic platform.

76. The apparatus of claim 68, wherein a dispersion of the input dispersive element and a dispersion of the pump pulse dispersive element are matched by providing the pump pulse dispersive element to be twice a dispersive length of the input dispersive element.

77. The apparatus of claim 68, wherein the apparatus further includes a pump pulse generator.

78. The apparatus of claim 68, wherein a peak optical power inside the optical element is maintained at a sufficiently low level to avoid self-phase modulation.

79. The apparatus of claim 68, wherein a peak optical power inside the optical element is maintained at a sufficiently low level to avoid two photo induced free carrier effects.

80. The apparatus of claim 69, wherein the output waveform is temporally stretched relative to the input waveform by a factor determined by the ratio between the total dispersions of the output dispersive element and the input dispersive element.

81. The apparatus of claim 68, wherein one or more of the input dispersive element and the pump pulse dispersive element includes structure selected from the group consisting of optical fibers, optical wave guides, chirped Bragg gratings, free space gratings and prisms.

82. The apparatus of claim 68, wherein the apparatus further comprises a single shot spectrometer for performing a single shot measurement of a temporal profile of the input waveform.

83. The apparatus of claim 68, wherein a certain dispersive element of the apparatus has a dispersion slope sufficiently low to avoid distortion resulting from third order dispersion.

84. The apparatus of claim 68, wherein a certain dispersive element of the apparatus has relative dispersion slope that is less than 0.00335 nm$^{-1}$ at 1550 nm.

85. The apparatus any of claim 68, wherein the optical element is integrated on a photonic chip.

86. The apparatus of claim 85, wherein the input dispersive element is integrated on the photonic chip.

87. The apparatus of claim 85, wherein the pump pulse dispersive element is integrated on the photonic chip.

88. The apparatus of claim 85, wherein the apparatus further comprises a source of the pump pulse integrated on the photonic chip.

89. The apparatus of claim 85, wherein the apparatus further comprises a spectrometer integrated on the photonic chip.

90. The apparatus of claim 89, wherein the spectrometer includes a grating and a photodetector array, wherein the grating is fabricated by etching a mass of waveguiding material, wherein the photodetector array is fabricated by etching a mass of photosensitive semiconductor material.

91. The apparatus of claim 68, wherein the apparatus is included in a system that outputs a record representing a succession of optical pulses, the apparatus including a processing unit for processing the record, the processing unit being operative for processing one or more pulse representations of the record to determine whether one or more optical pulses satisfy a criteria indicative of the one or more optical pulses having acceptable quality, and wherein the processing unit is operative to generate an output responsively to the processing.

92. The apparatus of claim 68, wherein the apparatus includes first and second output dispersive elements having first and second dispersions, wherein the apparatus includes a first photodetector coupled to the first output dispersive element for output of a first record having a first record length, and a second photodetector coupled to the second output dispersive element for output of a second record having a second record length different from the first record length.

93. An method for characterizing an input waveform, the method comprising:
- providing an input dispersive element through which an input waveform passes;
- providing a pump pulse dispersive element through which a pump pulse passes;
- passing the input waveform through the input dispersive element and passing a pump pulse through the pump pulse dispersive element;
- combining the input waveform dispersed by the input dispersive element and the pump pulse dispersed by the pump pulse dispersive element by four wave mixing in an optical element for output of an output waveform that is wavelength shifted relative to the input waveform;
- wherein a dispersion of the input dispersive element and a dispersion of the pump pulse dispersive element are matched in a manner so that a spectrum of the output waveform represents a temporal profile of the input waveform.

* * * * *